(12) United States Patent
Walker et al.

(10) Patent No.: US 8,706,632 B2
(45) Date of Patent: *Apr. 22, 2014

(54) METHOD AND APPARATUS FOR PROCESSING CREDIT CARD TRANSACTIONS

(75) Inventors: Jay S. Walker, Ridgefield, CT (US); Magdalena Mik, Greenwich, CT (US); Stephen C. Tulley, Stamford, CT (US); Daniel E. Tedesco, New Canaan, CT (US); Andrew S. Van Luchene, Norwalk, CT (US)

(73) Assignee: Inventor Holdings, LLC, Stamford, CT (US)

( * ) Notice: Subject to any disclaimer, the term of this patent is extended or adjusted under 35 U.S.C. 154(b) by 510 days.

This patent is subject to a terminal disclaimer.

(21) Appl. No.: 12/791,567

(22) Filed: Jun. 1, 2010

(65) Prior Publication Data

US 2010/0241502 A1 Sep. 23, 2010

Related U.S. Application Data

(63) Continuation of application No. 09/316,546, filed on May 21, 1999, now Pat. No. 7,729,988, which is a continuation-in-part of application No. 08/920,116, filed on Aug. 26, 1997, now Pat. No. 6,119,099, which is a continuation-in-part of application No. 08/822,709, filed on Mar. 21, 1997, now Pat. No. 6,267,670.

(51) Int. Cl.
    *G06Q 40/00* (2012.01)
(52) U.S. Cl.
    USPC .............................................. 705/44; 705/39

(58) Field of Classification Search
    USPC .................................................. 705/39, 40
    See application file for complete search history.

(56) References Cited

U.S. PATENT DOCUMENTS

| 4,247,759 A | 1/1981 | Yuris et al. |
| 4,491,725 A | 1/1985 | Pritchard |
| 4,500,880 A | 2/1985 | Gomersall et al. |
| 4,667,292 A | 5/1987 | Mohlenbrock et al. |
| 4,750,119 A | 6/1988 | Cohen et al. |
| 4,833,308 A | 5/1989 | Humble |

(Continued)

FOREIGN PATENT DOCUMENTS

| EP | 0 109 189 A1 | 5/1984 |
| EP | 0 809 202 | 11/1997 |

(Continued)

OTHER PUBLICATIONS

Wilson, J., Restaurants offering own tips on how much to give waiter, Apr. 21, 1999, Milwaukee Journal Sentinel. Milwaukee, Wis.: p. 8.*

(Continued)

*Primary Examiner* — Hani M Kazimi
*Assistant Examiner* — Clement B Graham
(74) *Attorney, Agent, or Firm* — Michael D. Downs; Fincham Downs, LLC

(57) ABSTRACT

Systems and methods are disclosed whereby credit and debit card transactions are processed at a merchant point-of-sale terminal in a manner that provides customers the opportunity to receive one or more charge enhancement offers which are presented to the customer on a record of charge.

19 Claims, 16 Drawing Sheets

(56) References Cited

U.S. PATENT DOCUMENTS

| | | | |
|---|---|---|---|
| 4,982,346 A | 1/1991 | Girouard et al. | |
| 5,003,384 A | 3/1991 | Durden et al. | |
| 5,025,372 A | 6/1991 | Burton et al. | |
| 5,173,851 A | 12/1992 | Off et al. | |
| 5,224,034 A | 6/1993 | Katz et al. | |
| RE34,380 E | 9/1993 | Sleevi | |
| 5,287,268 A | 2/1994 | McCarthy | |
| 5,297,026 A | 3/1994 | Hoffman | |
| 5,319,542 A | 6/1994 | King, Jr. et al. | |
| 5,333,186 A | 7/1994 | Gupta | |
| 5,380,991 A | 1/1995 | Valencia et al. | |
| RE34,954 E | 5/1995 | Haber et al. | |
| 5,420,606 A | 5/1995 | Begum et al. | |
| 5,434,394 A | 7/1995 | Roach et al. | |
| 5,450,938 A | 9/1995 | Rademacher | |
| 5,515,270 A | 5/1996 | Weinblatt | |
| 5,537,314 A | 7/1996 | Kanter | |
| 5,570,417 A | 10/1996 | Byers | |
| 5,619,558 A | 4/1997 | Jheeta | |
| 5,636,346 A | 6/1997 | Saxe | |
| 5,642,279 A | 6/1997 | Bloomberg et al. | |
| 5,652,784 A | 7/1997 | Blen et al. | |
| 5,687,322 A | 11/1997 | Deaton et al. | |
| 5,689,100 A | 11/1997 | Carrithers et al. | |
| 5,694,551 A | 12/1997 | Doyle et al. | |
| 5,710,884 A | 1/1998 | Dedrick | |
| 5,717,860 A | 2/1998 | Graber et al. | |
| 5,721,827 A | 2/1998 | Logan et al. | |
| 5,724,521 A | 3/1998 | Dedrick | |
| 5,727,153 A | 3/1998 | Powell | |
| 5,732,400 A | 3/1998 | Maudler et al. | |
| 5,734,838 A | 3/1998 | Robinson et al. | |
| 5,752,238 A | 5/1998 | Dedrick | |
| 5,761,648 A | 6/1998 | Golden | |
| 5,774,868 A | 6/1998 | Cragun et al. | |
| 5,794,207 A | 8/1998 | Walker et al. | |
| 5,794,210 A | 8/1998 | Goldhaber et al. | |
| 5,794,220 A | 8/1998 | Hunt | |
| 5,794,221 A | 8/1998 | Egendorf | |
| 5,806,044 A | 9/1998 | Powell | |
| 5,806,045 A | 9/1998 | Biorge et al. | |
| 5,812,769 A | 9/1998 | Graber et al. | |
| 5,819,092 A | 10/1998 | Ferguson et al. | |
| 5,822,736 A | 10/1998 | Hartman et al. | |
| 5,825,881 A | 10/1998 | Colvin, Sr. | |
| 5,838,773 A | 11/1998 | Eisner et al. | |
| 5,839,119 A | 11/1998 | Krsul et al. | |
| 5,848,396 A | 12/1998 | Gerace | |
| 5,850,217 A * | 12/1998 | Cole | 715/700 |
| 5,855,008 A | 12/1998 | Goldhaber et al. | |
| 5,857,175 A | 1/1999 | Day et al. | |
| 5,864,822 A | 1/1999 | Baker, III | |
| 5,870,030 A | 2/1999 | DeLuca et al. | |
| 5,873,068 A | 2/1999 | Beaumont et al. | |
| 5,873,069 A | 2/1999 | Reuhl et al. | |
| 5,884,271 A | 3/1999 | Pitroda | |
| 5,884,292 A | 3/1999 | Baker et al. | |
| 5,887,903 A * | 3/1999 | Schreadley, Jr. | 283/60.2 |
| 5,890,135 A | 3/1999 | Powell | |
| 5,893,075 A | 4/1999 | Plainfield et al. | |
| 5,918,211 A | 6/1999 | Sloane | |
| 5,923,016 A | 7/1999 | Fredregill et al. | |
| 5,937,037 A | 8/1999 | Kamel et al. | |
| 5,970,469 A | 10/1999 | Scroggie et al. | |
| 6,014,634 A | 1/2000 | Scroggie et al. | |
| 6,049,778 A | 4/2000 | Walker et al. | |
| 6,052,730 A | 4/2000 | Feliciano | |
| 6,076,069 A | 6/2000 | Laor | |
| 6,144,948 A | 11/2000 | Walker et al. | |
| 6,173,274 B1 | 1/2001 | Ryan, Jr. | |
| 6,185,545 B1 | 2/2001 | Resnick et al. | |
| 6,233,564 B1 * | 5/2001 | Schulze, Jr. | 705/14.19 |
| 6,327,580 B1 | 12/2001 | Pierce et al. | |
| 6,336,095 B1 | 1/2002 | Rosen | |
| 6,349,288 B1 | 2/2002 | Barber | |
| 6,393,407 B1 | 5/2002 | Middleton | |
| 6,965,870 B1 | 11/2005 | Petras | |
| 2001/0014868 A1 | 8/2001 | Herz et al. | |

FOREIGN PATENT DOCUMENTS

| | | |
|---|---|---|
| EP | 0 902 381 | 3/1999 |
| WO | WO 95/03570 | 2/1995 |
| WO | WO 96/36926 | 11/1996 |
| WO | WO97/35441 | 9/1997 |
| WO | WO 97/46961 | 12/1997 |
| WO | WO 96/31848 | 7/1998 |
| WO | WO 98/28699 | 7/1998 |
| WO | WO 98/43149 | 10/1998 |
| WO | WO 99/11007 | 3/1999 |
| WO | WO 99/66438 | 12/1999 |
| WO | WO 99/66443 | 12/1999 |
| WO | WO 00/21004 | 4/2000 |
| WO | WO 01/08025 | 6/2000 |
| WO | WO 00/39720 | 7/2000 |

OTHER PUBLICATIONS

Hesser, A., At tip time, restaurants do the math, Apr. 7, 1999, New York Times. p. 1. F.1.*

Classified Ad 9—No Title,New York Times (1923-Current file); Mar. 30, 1941; ProQuest Historical Newspapers: The New York Times (1851-2009) p. F8.*

Booker, Ellis, "Checkout Lines to Offer More than Just Candy and Waiting", Computerworld, PCs & Workstations, May 21, 1990, 1 pg.

U.S. Appl. No. 08/943,483 entitled, "System and Method for Facilitating Acceptance of Conditional Purchase Offers (CPOs)", filed Oct. 3, 1997, 31 pp.

U.S. Appl. No. 08/994,426 entitled, "Method and Apparatus for Providing Supplementary Product Sales to a Customer at a Customer Terminal", filed Dec. 19, 1997, 29 pp.

U.S. Appl. No. 09/100,684 entitled, "Billing Statement Customer Acquisition System", filed Jun. 19, 1998, 21 pp.

"Shoppers Charge Accounts Co. to Administer Private Label Credit Card for Lew Magram, Ltd., Program Marks SCA's Entry into Retail Catalog/Mail Order Industry", PR Newswire Financial News, Jun. 29, 1998, 2 pp.

U.S. Appl. No. 09/166,405 entitled, "Method and Apparatus for Defining Routing of Customers between Merchants", filed Oct. 5, 1998, 50 pp.

U.S. Appl. No. 09/166,367 entitled, "Method and Apparatus for Providing a Discount to a Customer that Participates in Transactions at a Plurality of Merchants", filed Oct. 5, 1998, 40 pp.

"Competition: First USA, with its Microsoft Pact, Is King of the Internet", Credit Card News, Nov. 1, 1998, 2 pp.

U.S. Appl. No. 09/205,663 entitled, "Method and System for Utilizing a Psychographic Questionnaire in a Buyer-Driven Commerce System", filed Dec. 4, 1998, 38 pp.

U.S. Appl. No. 09/219,267 entitled, "Method and Apparatus for Facilitating Electronic Commerce through Providing Cross-Benefits during a Transaction", filed Dec. 23, 1998, 33 pp.

U.S. Appl. No. 09/221,099 entitled, "Pre-Sale Data Broadcast System and Method", filed Dec. 28, 1998, 41 pp.

U.S. Appl. No. 09/223,901 entitled, "System and Method for Encouraging Competitive Participation in an Auction", filed Dec. 31, 1998, 30 pp.

U.S. Appl. No. 09/223,903 entitled, "System and Method for Negative Retroactive Discounts", filed Dec. 31, 1998, 58 pp.

U.S. Appl. No. 09/224,907 entitled, "Method and Apparatus for Detecting and Deterring the Submission of Similar Offers in a Commerce System", filed Jan. 14, 1999, 23 pp.

"Rent from NetFlix.com Buy from Amazon.com", Official Press Release, Jan. 17, 1999, 1 pg.

Brochure: "Inside: A year of free TIME from Sprint", TIME, Inc., undated, 5 pp.

Gifis, Steven H., "Law Dictionary", Fourth Edition, 4 pp.

"Cellular Wrong Signals", Newsday, Jul. 22, 1993, 1 pg.

Ellis, Stephen, "Credit card firms drive down costs", Sunday Times, Feb. 27, 1994, 4 pp.

(56) References Cited

OTHER PUBLICATIONS

Foster, Ed, "The GRIPE LINE; Can mixing cookies' with online marketing be a recipe for heartburn?", InofWorld, Jul. 22, 1996, 4 pp.
Fickenscher, Lisa, "Amex to Start Free Rewards Program with Discounts on Merchandise", The American Banker, Oct. 18, 1996, Section: Credit/Debit/ATMs, 2 pp.
Fitzgerald, Kate, "Amex Program Moves Loyalty to Next Level: Custom Extras Finds a Medium Customers Can't Ignore: Billing Statements", Advertising Age, Nov. 4, 1996, 2 pp.
Fickenscher, Lisa, "Merchant: American Express Seeks to Mine Its Data on Cardholder Spending Patterns", The American Banker, Mar. 24, 1997, Section: Credit/Debit/ATMs, 2 pp.
Holton, Lisa, "Cable Efforts Help Issuers Tune Into New Markets", Card Marketing, Jan. 1999, 2 pp.
Shook, David, "Rebate Limits Can Be a Pain for Consumers", The Buffalo News, Jan. 5, 1999, Section: CLICK, 2 pp.
"Definition for: point of sale", (http //www computeruser com/resources/dictionary/definition html?lookup=5269), download date: Dec. 3, 2002, 1 pg.
"Milestone Events Making Spring History 1899-1989", undated. 1 pg.
Sims, Calvin, "Centel Acquiring Cellular Phone Unit", The New York Times, May 28, 1988, Section 1, 2 pp.
Butcher, Lola, "United May Pocket Windfall With Sale of Cellular Business", Kansas City Business Journal, Jun. 6, 1988, 3 pp.
Winter, Christine, "GTE to Sell Par of US Sprint Stake Deal to Shift Another 30% to Partner Untied Telecom", Chicago Tribune, Jul. 19, 1988, 2 pp.
"United Telecommunications Announces Completion of Sale", PR Newswire, Oct. 5, 1988, 2 pp.
Henze, Doug, "A Tightening in Cellular Market", Oakland Business Monthly, Aug. 1989, Section 1, 6 pp.
"United Telecom halts Sprint deal as net falls", Chicago Tribune, Jul. 18, 1990, Section: Business, 3 pp.
Connely, Joanne, "FCC gets spectrum comments; US Federal Communications Commission investigates development of personal communications networks and radio-based technologies", Chilton's Electronic News, Jan. 28, 1991, 3 pp.
Manuta, Lou, "Should cellular be deregulated? Cellular radio telephones; Industry Overview", Cellular Marketing, Jan. 1992, 6 pp.
Rossa, James L., "Cellphones ride roller coaster; American Information Technologies Corp. to cut commission rebates to retailers", HFD—The Weekly Home Furnishings Newspaper, Feb. 3, 1992, Section: vol. 66, No. 5, p. 89, 3 pp.
La Rossa, James Jr., "Ameritech policy stirs debate; executives weigh retailer rebates on eve of Cellular Telecommunications Industry Association Show; American Information Technologies Corp; Special CTIA Show Issue", HFD—The Weekly Home Furnishings Newspaper, Feb. 10, 1992, 3 pp.
Ziegler, Bart, "Sprint to Merge with Centel", Associated Press, May 28, 1992, 3 pp.
Marek, Sue, "The carrier/retailer love affair—still going strong? Cellular radio industry; Cover Story", Cellular Marketing, Jul. 1992, 5 pp.
"Resale Effect Debate; GAO Faults FCC on Cellular Duopoly Scheme", Communications Daily, Jul. 2, 1992, 2 pp.
Strandjord, Jeannine M., "Should you bundle 401k services? Employee Benefits", Financial Executive, Sep. 1992, 6 pp.
Brown, Bob and Wallace, Bob, "AT&T bid fro McCaw to reshape landscape; Gives dominant carrier access to rapidly evolving market and opportunity to influence, drive, change.", Network World, Nov. 9, 1992, Section: Top News, 3 pp.
Avril, Tom, "Centel Confident of Victory After Vote on Sprint Merger", Dec. 2, 1992, 3 pp.
Avril, Tom, "Communications; Centel Investors Vote on Sprint Merger", The Commercial Appeal, Dec. 3, 1992, Section: Business, 2 pp.
Oloroso Jr., Arsenio, "Centel holds its breath; Shareholders wait to see outcome of Sprint deal", Crain's Chicago Business, Dec. 7, 1992, 2 pp.

Yates, Ronald E., "Sprint-Centel merger complete despite fears", Chicago Tribune, Mar. 10, 1993, Section: Business, 3 pp.
Wenske, Paul, "Sprint's big deal", Ingram's, May 1993, 8 pp.
"Petition Criticized; Fight on CPE Unbundling for IXC Resellers Launched by Major Retailers", Communications Daily, Aug. 10, 1993, Section: vol. 13, No. 153, 3 pp.
DeFebo, Carl Jr., "Sprint opens first superstore in Mechanicsburg", Central Penn Business Journal, Nov. 3, 1993, 3 pp.
"Testimony Feb. 8, 1994, John V. Roach Consumer Electronics Retailers Coalition House Energy/Telecommunications and Finance Antitrust Reform Act of 1993", Federal Document Clearing House Congressional Testimony, Feb. 8, 1994, 8 pp.
"Sprint—Company Data", Securities and Exchange Commission Form 10-Q, for the quarterly period ended Mar. 31, 1994, 4 pp.
"Form 10-K Sprint Corp—FON", Filed Mar. 15, 1994 (period Dec. 31, 1993), 8 pp.
Kraemer, Joseph S., "Local competition; Changing Ground Rules for Network Access", Business Communications Review, Sep. 1994, 10 pp.
Steward, Shawn, "Activating the masses", Cellular Business, Oct. 1994, Section: vol. 11, No. 10, 6 pp.
"Sprint—Defining the Communications Company of the Future 1994 Annual Report to Shareholders", Document Date: Dec. 31, 1994, Filing Date: Mar. 22, 1995, 4 pp.
"Inside Sprint Corporation: 1994 Competitive Market Developments", Inside Telecom, Jul. 17, 1995, 7 pp.
"Tandy Corp—Form-Type ARS", Document Date: Dec. 31, 1995, Filing Date: Apr. 10, 1996, 90 pp.
"Sprint Completes Spin-Off of It's Cellular Subsidiary", Chicago Sun-Times, Mar. 8, 1996, 2 pp.
"Securities and Exchange Commission Form 10-K/A, 360 Degrees Communications Co Cross-Reference: Sprint Cellular Co", For the fiscal year ended Dec. 31, 1995, Filing date: Apr. 16, 1996, 23 pp.
Press Release: "Sprint, Sprint Spectrum and Radio Shack Join Forces", New York, NY, Sep. 11, 1996.7 pp.
Maxon, Terry, "Tandy pairs with Sprint for venture; Companies will offer expanded offering of telecommunications products, services", The Dallas Morning News, Sep. 12, 1996, Section: Business; 3 pp.
Hopper, Kathryn, "Tandy, Sprint to offer one-stop phone shopping", Fort Worth Star-Telegram, Sep. 12, 1996, 4 pp.
"Tandy Corporation—Quarterly Report", For the quarterly period ended Sep. 30, 1996, Filed Nov. 12, 1996, 36 pp.
Alleman, James and Cole, Larry, "The International Handbook of Telecommunications Economics, vol. III, Sprint—GTE's lost opportunity", Edward Elgar Publishers, 2002, 13 pp.
King, Suzanne and Hayes, David, "Sprint PCS has played key role in cell phone boom", Posted: Jan. 6, 2002, 10 pp.
"Examiner's Affidavit", Affidavit of USPTO Primary Examiner, Apr. 11, 2003, 1 pg.
Website: "Sprint 1995 Annual Report—Notes to Consolidated Financial Statements", (http //www sprint com/sprint/annual/95/finance/p_52a html), download date Oct. 21, 2003, 1 pg.
Website: "Sprint/History", (http www sprint com/sprint/ir/sd/timeline_02 html), download date: Jul. 276, 2004, 2 pp.
Website: "Surviving the Great Depression", (http //www geocities com/Athens/Column/4735/clbrown2 html), download date: Nov. 13, 2003, 2 pp.
Website: "The Mobile: 20 Years Young", (http: //motoinfo Motorola com/motoinfo/$20^{th}$_anniversary/docs/timeline pdf), download date: Jan. 9, 2004, 2 pp.
Website: "Qualcomm About Qualcomm—History / Key Milestones", (http www qualcomm com/about/history/ html), download date: Jul. 27, 2004, 5 pp.
Press Release: "Fort Worth Outlet Square Offers American Airlines Advantage Miles", Released Aug. 21, 1996, 2 pp.
Taylor, Paul, "Towards a dream market", Financial Times, Sep. 4, 1996, Section: Survey—FT IT, 2 pp.
Donlon, Brian, USA Today, "Cable Industry channels its efforts in April," Mar. 29, 1990, 2 pp.
Blattberg, Robert C and Levin, Alan, "Modeling the Effectiveness and Profitability of Trade Promotions", Marketing Science, 1987, 23 pp.

(56) References Cited

OTHER PUBLICATIONS

Anonymous, Discount Store News, Manufacturers shine with cross promotional prowess, Aug. 5, 1996, 2 pp.
Nimmer, Raymond T., "Commercial Transactions on the Global Information Infrastructure: Electronic Contracting: Legal Issues", The John Marshall Journal of Computer Information Law, 14 J. Marshall J. Computer & Info. L. 211, Winter 1996, 26 pp.
Bonnici, Joseph et al., "Consumer issues in coupon usage: An exploratory analysis", Journal of Applied Business Research, winter 1996/1997, 13 pp.
"Dispensing the future", Electronic Payments International, May 1997, Section: Feature; 5 pp.
"Products and Services, Checkout Direct", Catalina Marketing Corporation, (http //catalinamktg com/prodcdir htm), download date: May 29, 1997, 14 pp.
"Industry Briefs", Card News, Jun. 9, 1997, Section: vol. 12, No. 11, 2 pp.
Schanhausser, Mark, "A maze of plastic consumers try to make their way through the confusing state of credit cards", St. Louis Post Dispatch, Jul. 30, 1994, 2 pp.
Edwards, John G. "Credit card issuers see some growth", Las Vegas Review—Journal. Mar. 18, 1994, 2 pp.
Reilly, Brian, "Upselling strategies hit the net", Net Marketing, Dec. 1996, 4 pp.
"Heads I win, tails you lose", The Economist, Jun. 13, 1992, 2 pp.
Yoshihara, Nancy "New Magazines Try to Reach Asian Businesses The Fledgling English-Language Publication seek Readers on both sides of the Pacific", Los Angeles Times, Oct. 2, 1989, 3 pp.
Samuelson, Paul, Economics Ninth Edition, Copyright 1973, 10 pp.
Spoor, Dana L., "Selling a free phone", Cellular Business, Feb. 1994, vol. 11, No. 2, 5 pp.
Crump, Stuart F. Jr., "Faith goes cellular (case study of a real estate agent's selection of a cellular phone and carrier)", Home Office Computing, Jun. 1994, 3 pp.
Mr. Pigeon, "Cell Phone Hype Pigeon Family Sweats the Details", Star Tribune, Jan. 29, 1995, Edition: Metro Edition, Section: Marketplace, 2 pp.
Parker, Penny, "Cart vendors offer line-free shopping", Denver Post, Dec. 20, 1995, pp.
Lacher, Lisa, "Coupon Gimmick Registers Profits", Business Record, Dec. 7, 1987, 2 pp.
Stevens, Lawrence, "Hypermarket challenge", Computerworld, Dec. 10, 1988, 2 pp.
Blattberg, Robert C., "Interactive marketing; exploiting the age of addressability", Sloan Management Review, Sep. 22, 1991, 15 pp.
McDowell, Bill, "Frequency marketing builds repeat business" Building Supply Home Centers, Aug. 1993, 5 pp.
Kristof, Kathy, "Card Sharks Are in Season; Be Wary of Discounts and Rebates as You Shop Around for Good Credit", Chicago Tribune, Nov. 23, 1993, 2 pp.
Smith, Alison, "Survey of UK Consumer Credit and Asset Finance", Financial Times, Nov. 3, 1994, 3 pp.
Linnen, Herb et al. "AT&T comments on new FCC rules to curb slamming", Jun. 14, 1995, 4 pp.
Andreoli, Tom et al., "Cash Machines Offer a Whole Lotto Money . . . ", Crain's Chicago Business, Jun. 19, 1995, Section: News, 2 pp.
McKinney, Jeff, "Merchant program could pay off for provident", The Cincinnati Enquirer, Mar. 24, 1996, 2 pp.
"Switch your Chase MasterCard to a Shell MasterCard from Chase and you'll earn: Free Formula Shell Gasoline", Chase Manhattan Bank USA, N,A., Sep. 1997, 2 pp.
Hoeschen, Brad, "Brookfield Square hopes mall card strikes a chord", Business Journal-Milwaukee, Sep. 12, 1997, Section: vol. 14, No. 50, 2 pp.
Kraus, Jeffrey, "Subsidized TV sets?", CED (Communications Engineering & Design), Feb. 1998, 3 pp.
Goldblatt, Henry, "AT&T Finally Has an Operator . . . ", Fortune, Feb. 16, 1998, 4 pp.

"New Partners, more exciting rewards: The Membership Rewards program for 1998", (http //www americanexpress com/rewards/news/docs/1998new_mr shtml), download date: Mar. 12, 1998, 38 pp.
Elstrom, Peter, "Reach Out and Pay Someone", Business Week, Mar. 23, 1998, 1 pg.
Website: "MCI Freeflix Free Video Rental Program", (http //www mci com/aboutus/products/prepaid/promotional shtm), download date: Apr. 21, 1998, 1 pg.
Website: "Wall Street Access . . . : Active Trader Rebate Program", (http //www wsaccess com/active_rebate_program htm), download date: Apr. 22, 1998, 2 pp.
Amato-McCoy, Deena, "Co-Branded Acme Credit Card Rewards Loyal Users" Supermarket News, Jun. 15, 1998, Section: 1 pg.
Website: "DealDeal com—The Best Auction Deals on the . . . ; Bid to Win", (http www dealdeal com/pxfm/bidandwin cfm?classID—elc &cid=&cal—), download date: Oct. 29, 1998, 1 pg.
Ross, Chuck et al., "Coke Card promotion set for '98", (http //web archive org/web/19980116055228/http //adage com/news_and_feaures/feature...), download date: Nov. 14, 2003, 2 pp.
Schrage, Michael, "An experiment in economic theory", Nov. 26, 1989, 3 pp.
Wells Fargo ATMs in California Become Little Billboards, The Associated Press, Mar. 29, 1999, 1 pg.
Cellular wrong signals, Newsday, Jul. 2, 1993, 1 pg.
Foster, Ed, "Can mixing cookies with online marketing be a recipe for heartburn?" Jul. 22, 1996, 2 pp.
Brochure: "Reaching Out in New Directions" 1996, 18 pp.
Jensen, Elizabeth, "Yakking it Up", The Wall Street Journal Europe, Apr. 28, 1998, 5 pp.
Point.com: webpage copyright 1998-2000, 5 pp.
Travel Agent. "No-Show Crackdown", Aug. 18, 1997, 4 pp.
SNET Digital Value Plans, Jun. 12, 1998, 1 pg.
Radio shack introduces Handheld Flip-Style Cellular Telephone With Vibration Alert, Oct. 16, 1996, 2 pp.
Wildstrom, Stephen H., "Pagers that can spell it out", Business Week, Jan. 16, 1995, 2 pp.
Competitive long distance company GST Telecom has filed suit in U.S. District County, Tucson May 15, 1996, 3 pp.
"Shamrock Technology Co. establishes No. American HQ as monitor . . . ", Business Wire, Mar. 25, 1997, 2 pp.
AT & T Wireless adds convenience to buying cellular service, Nov. 20, 1996, 2 pp.
"Ads in the ether on PCS phones, pagers" Brandweek, Mar. 31, 1997, 3 pp.
Oslund, John, "The Battle is Joined", Startribune.com, Feb. 12, 1996, 6 pp.
www. buy. com cellular phones, copyright 1997-2003, 2 pp.
Verizon Wireless at Radio Shack, www. radioshack. com/partners / verizon / verizon landing, 3 pp.
Tedesco, Richard "Pactel pushed 'Net access" Broadcasting & Cable, Jun. 3, 1996, 2 pp.
Colman, Price "Cross-Marketing cuts cable bills", Broadcasting & Cable, Jul. 15, 1996, 3 pp.
Fleming et al., "European Banks, Insurance Firms Cross Into Each. Other's Territory", Wall Street Journal, Feb. 20, 1991, 4 pp.
Office Action for U.S. Appl. No. 09/219,267 mailed Jun. 13, 2008, 12 pp.
Office Action for U.S. Appl. No. 09/219,267 mailed Sep. 7, 2007, 17 pp.
Office Action for U.S. Appl. No. 09/579,215 mailed Mar. 20, 2008, 4 pp.
Office Action for U.S. Appl. No. 09/282,747 mailed Jun. 12, 2008, 14 pp.
Office Action for U.S. Appl. No. 09/282,747 mailed Sep. 7, 2007, 23 pp.
Office Action for U.S. Appl. No. 09/322,351 mailed Apr. 17, 2008, 18 pp.
Office Action for U.S. Appl. No. 09/322,351 mailed Aug. 20, 2007, 25 pp.
Office Action for U.S. Appl. No. 11/423,481 mailed Jun. 2, 2008, 17 pp.

(56) References Cited

OTHER PUBLICATIONS

Office Action for U.S. Appl. No. 11/423,481 mailed Oct. 9, 2007, 24 pp.
Office Action for U.S. Appl. No. 11/423,481 mailed Jan. 25, 2007, 6 pp.
Office Action for U.S. Appl. No. 11/423,493 mailed Oct. 18, 2007, 21 pp.
Office Action for U.S. Appl. No. 11/423,493 mailed Jan. 26, 2007, 6 pp.
Office Action for U.S. Appl. No. 11/423,498 mailed Oct. 18, 2007, 9 pp.
Office Action for U.S. Appl. No. 11/423,498 mailed Jan. 26, 2007, 6 pp.
Marn & Rosiello, "Managing price, gaining profit", McKinsey Quarterly, Autumn, 1992, 10 pp.
Affidavit of Michael D. Downs with Exhibits, dated Apr. 6, 2007, 19 pp.
Affidavit of Michael D. Downs with Exhibits, dated Apr. 6, 2007, 91 pp.
Decision on Appeal, U.S. Appl. No. 09/540,034, decided Mar. 26, 2007, 16 pp.
International Search Report for PCT/US00/18474, mailed Jun. 18, 2001, 4 pp.
International Search Report for PCT/US99/13409, mailed Jun. 14, 1999, 6 pp.
International Search Report for PCT/US99/13819, mailed Jun. 18, 1999, 7 pp.
Office Action for U.S. Appl. No. 09/219,267, mailed Mar. 10, 2009, 15 pp.
Office Action for U.S. Appl. No. 11/423,481, mailed Mar. 5, 2009, 18 pp.
Office Action for U.S. Appl. No. 09/282,747, mailed Mar. 4, 2009, 16 pp.
Office Action for U.S. Appl. No. 09/274,281, mailed Feb. 20, 2009, 4 pp.
Office Action for U.S. Appl. No. 09/274,281, mailed May 5, 2008, 6 pp.
Office Action for U.S. Appl. No. 09/274,281, mailed Jun. 29, 2007, 5 pp.
Office Action for U.S. Appl. No. 09/219,267 mailed Mar. 6, 2006, 20 pp.
Office Action for U.S. Appl. No. 09/219,267 mailed Dec. 14, 2004, 28 pp.
Office Action for U.S. Appl. No. 09/219,267 mailed Jan. 9, 2004, 28 pp.
Office Action for U.S. Appl. No. 09/219,267 mailed Apr. 22, 2003, 19 pp.
Office Action for U.S. Appl. No. 09/219,267 mailed May 17, 2001, 22 pp.
Office Action for U.S. Appl. No. 09/579,215 mailed Jul. 12, 2007, 21 pp.
Office Action for U.S. Appl. No. 09/579,215 mailed Mar. 6, 2006, 20 pp.
Office Action for U.S. Appl. No. 09/579,215 mailed Dec. 17, 2004, 24 pp.
Office Action for U.S. Appl. No. 09/579,215 mailed Apr. 7, 2004, 32 pp.
Office Action for U.S. Appl. No. 09/579,215 mailed Jul. 29, 2003, 20 pp.
Office Action for U.S Appl. No. 09/282,747 mailed Feb. 27, 2007, 25 pp.
Office Action for U.S. Appl. No. 09/282,747 mailed Mar. 21, 2006, 22 pp.
Office Action for U.S. Appl. No. 09/282,747 mailed Dec. 7, 2004, 25 pp.
Office Action for U.S. Appl. No. 09/282,747 mailed Apr. 13, 2004, 17 pp.
Office Action for U.S. Appl. No. 09/282,747 mailed Nov. 19, 2002, 18 pp.
Office Action for U.S. Appl. No. 09/282,747 mailed Mar. 1, 2002, 20 pp.
Office Action for U.S. Appl. No. 09/282,747 mailed May 21, 2001, 43 pp.
Office Action for U.S. Appl. No. 09/282,747 mailed Oct. 13, 2000, 34 pp.
Office Action for U.S. Appl. No. 09/322,351 mailed Nov. 30, 2006, 24 pp.
Office Action for U.S Appl. No. 09/322,351 mailed Mar. 13, 2006, 20 pp.
Office Action for U.S. Appl. No. 09/322,351 mailed Nov. 19, 2004, 22 pp.
Office Action for U.S. Appl. No. 09/322,351 mailed Jan. 27, 2003, 28 pp.
Office Action for U.S. Appl. No. 09/322,351 mailed Sep. 25, 2001, 22 pp.
Office Action for U.S. Appl. No. 09/322,351 mailed Oct. 12, 2000, 34 pp.
Board of Appeals Decision for U.S. Appl. No. 09/540,034 decided May 16, 2007, 16 pp.
Examiner's Answer for U.S. Appl. No. 09/540,034 mailed Jan. 23, 2006, 42 pp.
Office Action for U.S. Appl. No. 09/540,034 mailed Oct. 10, 2003, 22 pp.
Office Action for U.S. Appl. No. 09/540,034 mailed Jan. 14, 2003, 21 pp.
Office Action for U.S. Appl. No. 09/219,267 mailed Jan. 5, 2010, 15 pp.
Office Action for U.S Appl. No. 09/282,747 mailed Dec. 10, 2009, 17 pp.
Office Action for U.S. Appl. No. 09/322,351 mailed Aug. 4, 2009, 20 pp.
Office Action for U.S. Appl. No. 11/423,481 mailed Mar. 5, 2009, 18 pp.
Interactive POS Video Yields Instant Results; Vision System Collects dDta, Produces Coupons and Cash Refunds; Supermarket Point of Sale Device, Chain Store Age Executive with Shopping Center Age, Sep. 1988, 4 pp.
Ricadela, Aaron, "Zero Ground—Stores Rethink Credit As IOUs Hit record Highs", Computer Retail Week, Aug. 24, 1998, 2 pp.
Guest Check, La Hacienda Restaurant, Stamford, Connecticut, Feb. 9, 1999, 1 pg.
Survey Express FAQs, Full Spectrum Marketing & Sales Corporation, (http: www. surveyexpress. Com/FAQ4.html) download date: Feb. 17, 1999, 2 pp.
Wilson, Jeff "Restaurants Try Guidelines for Tips", AP Online, Apr. 15, 1999, 2 pp.
Rozen, Miriam, "What's New in Joint Promotions", New York Times, Mar. 10, 1985, 1 pg.
Katcher, P. Royall, "Getting Products to consumers; The Basics of Retailing, part 2"; Automotive Marketing, 5 pp.
Shaw, Robert, "How the Smart Card is Changing Retailing"; Long Range Planning, 4 pp.
Checkstands Boost Supermarket Profits, China Store Age Executive, Dec. 1991, 2 pp.
Pogoda, Dianne M. "G.E.C.C. offers credit card with discounts, rebates"; General Electric Capital Corp., Women's Wear Daily, Sep. 3, 1992, 2 pp.
Set-Top Converger, Interactive Initiatives Abound at NCTA Convention, Communications Daily, Jun. 10, 1993, 2 pp.
Mandese, Joe "Interactive puts radio at crossroads; Out-of-home role", Advertising Age, Oct. 25, 1993, 3 pp.
Kristof, Kathy, "Card Sharks Are in Season: Be Wary of Discounts and Rebates As You Shop Around for Good Credit Deals", Chicago Tribune, Nov. 23, 1993, 2 pp.
Rosenberg, Joyce M. "GE Capital Comes to Macy's Aid Again", Associated Press, Feb. 17, 1994, 2 pp.
Ellis, Stephen, "Credit Card Firms Drive Down Costs", Times Newspapers Limited, Feb. 27, 1994, 4 pp.
Patch, Kimberly "Sied, InterNIC debut Internet services; Sled Corp offers electronic coupons for encrypton software", PC Week, May 16, 1994, 1 pg.

(56) References Cited

OTHER PUBLICATIONS

Ratcliffe, Mitch, "Lucie, interactive information, advertising stands upright, prepares to walk", Digital Media, Jun. 8, 1994, 4 pp.
Armstrong, Larry, "Coupon Clippers, Save Your Sissors", Business Week, Jun. 20, 1994, 2 pp.
Bowles, Bob, "ADSI: maximizing the synergy between the network and terminals; analog display service interface", Telephony, Aug. 29, 1994, 4 pp.
Block, Valerie, "GM Turns Up the Heat With Plan to Cross-Sell Some Financial Products", The American Banker, Nov. 18, 1994, 2 pp.
Wildstrom, Stephen H. "Pagers That Can Spell It All Out", Business Week, Jan. 16, 1995, 2 pp.
Ratcliffe, Mitch, "All Roads lead to Microsoft? Microsoft's Windows everywhere strategy", Digital Media, Mar. 6, 1995, 11 pp.
Meece, Mickey, "Big Finance Companies May Want Piece of Limited's Private-Label Card Program", The American Banker, Apr. 12, 1995, 2 pp.
Schrage, Michael, Free Stuff! Predatory pricing or creative cross-promotion? You be the judge; The Beta Version; Industry Trend or Event; Marketing Computers, Oct. 1995, 2 pp.
Various telecommunication-related articles in Communications Daily, May 15, 1996, 3 pp.
Marshall, Kyle, "More phone choices ring in", The News and Observer, Aug. 13, 1996, 2 pp.
Nolle, Tom, "Overcoming Cellular Déjà vu; Personal Communications Services," America's Network, Sep. 15, 1996, 6 pp.
Meece, Mickey. "Mastercard, Retailers Testing Point of Sales Discounts Program"; Credit/Debit/ATMS, Sep. 24, 1996, 1 pg.
Battle of the Bogoff: Roderick Oram on a Clash between Retailers and Manufacturers,' Financial times (London), Management, Marketing and Advertising, Oct. 24, 2 pp.
Wessel, Harry, "Rewarding Experience? Credit Cards Offering Bonuses Not for Everyone", Nov. 4, 1996, 3 pp.
"AT&T Wireless Adds Convenience to Buying Cellular services," M2 Communications Ltd. 1996; M2 Presswire, Pittsburgh, Nov. 20, 1996, 2 pp.
Selasky, Susan, "Easy-To-Swallow Savings; Diner Credit Cards Serve Wide Menu of Discounts", Detroit Free Press, Pittsburgh Post-Gazette, Dec. 5, 1996, 3 pp.
Merger Creates Alliance Data, Phillips Business Information, Dec. 16, 1996, 1 pg.
SNET Cellular Value Plans, SNET Price Plans brochure, 1997, 4 pp.
Beyer, Leslie. Target Marketing Made Easy; Supermarkets,' Delta Communications Inc., Grocery Marketing, Feb. 1997, 3 pp.
Higgins, Stephen, "Digital Phone Service on the way", New Haven Register, Jan. 7, 1997, 3 pp.
Kertstetter, Jim, "E-Commerce updates get intelligent agents; electronic commerce", PC Week, Feb. 3, 1997, 2 pp.
Warner, Bernhard, "Ads in the Ether on PC's Phones, Pagers (Will Consumers Accept Promo Beeps?)," Brandweek, Mar. 31, 1997, 3 pp.
Barlow, Rick, "Relationship Marketing: Coalition Marketing is Coming Back", Brandweek, Apr. 28, 1997, 2 pp.
"Emaginet Plans to Push Its Way into Consumer Mindset Pocketbook," Interactive PR and Marketing News, May 30, 1997, 2 pp.
Gilligan, Gregory, J. "Credit Cards From Retail Stores A Mixed Blessing for Shoppers", Richmond Times Dispatch, Jul. 20, 1997, 4 pp.
Simon, Ruth, "Make Sure Your Rebate Card Still Delivers The Goods", Money, Aug. 1997, 2 pp.
Williams, Martyn, "Internet Update", Newsbytes, Aug. 4, 1997, 3 pp.
Fitzgerald, Beth "New Jersey-Based SCA Helps Private Label Credit Cards Take Off", The Star-Ledger, Aug. 4, 1997, 3 pp.
Sanders, Edmund, "Tricky Business: The Magic of Rebate Cards Can Quickly Disappear", Chicago Tribune, Aug. 18, 1997, 3 pp.
Wijnen, Renee, "Cendant Eyes Cross-Marketing Opportunities," DM News, Feb. 2, 1998, 2 pp.
Cardholders think big, Bank Marketing International, Mar. 1998, 3 pp.

Wald, Matthew L., "Spending It: Untying Cellular Phones From Those Annual Contracts", Mar. 15, 1998, 2 pp.
American Eagle Outfitters, Inc., Introduces the First Clear Credit Card, Mar. 26, 1998, 1 pg.
Ling, The Hoi, "Prices of handphones dive, thanks to cross-subsidies", Business Times, Apr. 8, 1998, 2 pp.
Card Briefs: Beneficial, Casual Male Team Up on Card, The American Banker, May 4, 1998, 1 pg.
"Points Earn Little Credit as Cardholders Fail to Cash In" Birmingham Post May 9, 1998, 2 pp.
"Jay Jacobs Inc. Introduces Private Label Credit Card", Business Wire May 18, 1998, 1 pg.
"Wellsparks Group Launches V.I.P. Rewards; The Most Comprehensive Relationship Marketing Program Ever Created by a Mall Developer", Business Wire, May 19, 1998, 2 pp.
Quittner, Joshua, "Cell Phones at 7-1 1?". Almost everyone is selling wireless service these days. Time, Jul. 6, 1998.
Notice of Allowance for U.S. Appl. No. 09/219,267 mailed Aug. 30, 2010, 7 pp.
Notice of Allowance for U.S. Appl. No. 11/423,481 mailed Aug. 31, 2010, 7 pp.
Notice of Allowance for U.S. Appl. No. 09/282,747 mailed Aug. 30, 2010, 7 pp.
Office Action for U.S. Appl. No. 09/282,747 mailed Mar. 4, 2009, 17 pp.
Office Action for U.S. Appl. No. 09/282,747 mailed Jun. 12, 2008, 15 pp.
Office Action for U.S. Appl. No. 09/282,747 mailed Sep. 7, 2007, 24 pp.
Supplemental Notice of Allowability for U.S. Appl. No. 09/274,281 mailed Sep. 2, 2010, 17 pp.
Notice of Allowability for U.S. Appl. No. 09/274,281 mailed Jun. 9, 2010, 5 pp.
Office Action for U.S. Appl. No. 09/274,281 mailed Feb. 20, 2000, 4 pp.
Office Action for U.S. Appl. No. 09/274,281 mailed May 5, 2008, 7 pp.
Office Action for U.S. Appl. No. 09/274,281 mailed Jul. 25, 2005, 9 pp.
Office Action for U.S. Appl. No. 09/274,281 mailed Apr. 10, 2003, 8 pp.
Office Action for U.S. Appl. No. 09/274,281 mailed Apr. 12, 2002, 9 pp.
Office Action for U.S. Appl. No. 08/920,116, dated Oct. 1, 1999, 7 pp.
Notice of Allowance for U.S. Appl. No. 08/920,116, dated Oct. 25, 1999, 6 pp.
Office Action for U.S. Appl. No. 09/442,754 dated Aug. 2, 2000, 10pp.
Office Action for U.S. Appl. No. 09/442,754 dated Jan. 16, 2001, 10 pp.
Office Action for U.S. Appl. No. 09/442,754 dated Aug. 1, 2001, 5 pp.
Notice of Allowability for U.S. Appl. No. 09/442,754 dated Dec. 7, 2001, 3 pp.
Notice of Allowance for U.S. Appl. No. 09/442,754 dated Oct. 1, 2002, 7 pp.
Supplemental Allowance for U.S. Appl. No. 09/442,754 dated Mar. 4, 2003, 5 pp.
Notice of Allowance for U.S. Appl. No. 10/625,089 dated Oct. 6, 2008, 10 pp.
Office Action for U.S. Appl. No. 10/625,089 dated Sep. 10, 2007, 12 pp.
Office Action for U.S. Appl. No. 10/625,089 dated Apr. 5, 2006, 7 pp.
Office Action for U.S. Appl. No. 10/625,089 dated Oct. 24, 2005, 8 pp.
Notice of Allowance for U.S. Appl. No. 12/420,397 dated May 17, 2010, 9 pp.
Office Action for U.S. Appl. No. 12/420,397 dated Oct. 9, 2009, 6 pp.
Notice of Allowance for U.S. Appl. No. 12/938,025 dated Feb. 16, 2012, 5 pp.
Office Action for U.S. Appl. No. 12/938,025 dated Apr. 22, 2012, 12 pp.
Notice of Allowance for U.S. Appl. No. 09/316,546 dated Apr. 9, 2010, 4 pp.

(56) References Cited

OTHER PUBLICATIONS

Notice of Allowance for U.S. Appl. No. 09/316,546 dated Apr. 9, 2010, 17 pp.
Office Action for U.S. Appl. No. 09/316,546 dated Nov. 7, 2008, 10 pp.
Office Action for U.S. Appl. No. 09/316,546 dated Apr. 8, 208, 8 pp.
Office Action for U.S. Appl. No. 09/316,546 dated Nov. 13, 2006, 5 pp.
Office Action for U.S. Appl. No. 09/316,546 dated Dec. 16, 2004, 15 pp.
Office Action for U.S. Appl. No. 09/316,546 dated Nov. 13, 2002, 11 pp.
Written Opinion for PCT/US00/12007 mailed Jun. 15, 2001, 5 pp.
International Search Report for PCT/US00/12007 mailed Jan. 26, 2001, 5 pp.

* cited by examiner

| PRODUCT IDENTIFIER 502 | PRODUCT DESCRIPTOR 504 | PRODUCT PRICE 506 | PRODUCT CLASS 508 | AVAILABLE QUANTITY |
|---|---|---|---|---|
| P01 | STEAK SANDWICH | $10.95 | F | 3 |
| P02 | BBQ CHICKEN | $11.95 | F | 4 |
| P03 | HAMBURGER | $5.95 | F | 7 |
| P04 | LARGE DRINK | $2.95 | B | -- |
| P05 | SIDE ORDER | $5.95 | S | 12 |

← 314

| PRODUCT IDENTIFIER 512 | PRODUCT DESCRIPTOR 514 | PRODUCT PRICE 516 | PRODUCT CLASS 518 | AVAILABLE QUANTITY 520 |
|---|---|---|---|---|
| 841 | CORDLESS TELEPHONE | $21.68 | TELCO | 25 |
| 842 | PORTABLE RADIO | $11.95 | ELECTRONICS | 13 |
| 843 | CASSETTE TAPE | $5.95 | MUSIC AND VIDEO | 19 |
| 844 | 6 SPEAKER STEREO | $399.99 | HOME AUDIO | 4 |

FIG. 5B

| TRANSACTION IDENTIFIER 602 | CUSTOMER IDENTIFIER 604 | TRANSACTION TIME/DATE 606 | POS TERMINAL IDENTIFIER 608 | PRODUCT(S) PURCHASED 610 | ORIGINAL PURCHASE TOTAL 612 | FINAL PURCHASE TOTAL 614 |
|---|---|---|---|---|---|---|
| T 98765 | 3636-9988-9988-9988 | 12:14:42 3/1/999 | 001 | 8912, 5423 | $88.56 | $88.56 |
| T 98766 | 2121-4646-4646-4646 | 12:15:45 3/1/99 | 002 | 632, 964, 000 | $92.01 | $92.01 |
| T 98767 | 3434-8585-8585-8585 | 12:15:56 3/1/99 | 003 | 982, 2658 | $52.10 | $52.10 |
| T 98768 | 2636-9138-9138-9138 | 12:16:59 3/1/99 | 004 | 4985 | $127.93 | $127.93 |
| T 98769 | 2222-4444-6688-8888 | 12:17:02 3/1/99 | 005 | 841 | $21.13 | $0.00 |
| T 98770 | 5555-2525-2525-2525 | 12:17:43 3/1/99 | 002 | 844 | $423.99 | $458.99 |

| TRANSACTION IDENTIFIER 802 | ACCOUNT IDENTIFIER 804 | MERCHANT IDENTIFIER 806 | ORIGINAL PURCHASE TOTAL 808 | CHARGE ADJUSTMENT AMOUNT 810 | FINAL CHARGE AMOUNT 812 | POSTING TIME/DATE 814 |
|---|---|---|---|---|---|---|
| 00946123 | 1111-222-2222-2222 | 222 | $48.56 | -$2.00 | $46.56 | 14:45 3/2/99 |
| 00946124 | 1111-3333-3333-3333 | 111 | $38.01 | -$3.00 | $34.23 | 14:55 3/2/99 |
| 00946125 | 5555-1010-1010-1010 | 545 | $22.10 | +10%, +15%, +20% | $25.41 | 14:59 3/2/99 |
| 00946126 | 2222-4444-6688-8888 | 543 | $21.13 | -$21.13 | $0.00 | 15:05 3/2/99 |
| 00946127 | 5555-2525-2525-2525 | 432 | $423.99 | +35.00 | TBD | TBD |

METHOD AND APPARATUS FOR PROCESSING CREDIT CARD TRANSACTIONS

CROSS-REFERENCE TO RELATED APPLICATIONS

The present application is a continuation of U.S. patent application Ser. No. 09/316,546 entitled "METHOD AND APPARATUS FOR PROCESSING CREDIT CARD TRANSACTIONS" filed May 21, 1999 and issued as U.S. Pat. No. 7,729,988 on Jun. 1, 2010; which is a continuation in part of U.S. patent application Ser. No. 08/920,116, entitled "METHOD AND SYSTEM FOR PROCESSING SUPPLEMENTARY PRODUCT SALES AT A POINT-OF-SALE TERMINAL" filed Aug. 26, 1997 and issued as U.S. Pat. No. 6,119,099 on Sep. 12, 2000; which is a continuation in part of U.S. patent application Ser. No. 08/822,709 entitled "SYSTEM AND METHOD FOR PERFORMING LOTTERY TICKET TRANSACTIONS UTILIZING POINT-OF-SALE TERMINALS" filed Mar. 21, 1997 and issued as U.S. Pat. No. 6,267,670 B1 on Jul. 31, 2001.

The present application is also related to U.S. patent application Ser. No. 09/274,281 entitled "METHOD AND APPARATUS FOR PROVIDING CROSS-BENEFITS VIA A CENTRAL AUTHORITY" filed Mar. 22, 1999 and U.S. patent application Ser. No. 09/282,747 entitled "METHOD AND APPARATUS FOR PROVIDING CROSS-BENEFITS BASED ON A CUSTOMER ACTIVITY" filed Mar. 31, 1999.

Each of the above-referenced applications are incorporated by reference herein in their entirety.

FIELD OF THE INVENTION

The present invention relates generally to transaction processing, and relates more specifically to a method and apparatus for processing credit or debit card transactions.

BACKGROUND OF THE INVENTION

Transactions between customers and merchants typically occur at a point-of-sale terminal located at the merchant's place of business. A transaction begins when a customer brings one or more products to the point-of-sale terminal. A sales attendant operating the point-of-sale terminal then totals the amount due for the products. The total typically includes the subtotal of the prices for each product purchased and, in some jurisdictions, a tax in addition to the subtotal amount. The resulting purchase amount is then paid by the customer, thus completing the transaction.

Customers may typically pay for the purchase by presenting cash, a check, a credit card or a debit card at the merchant point-of-sale terminal. The amount of cash, the amount for which the check is drawn, or the available balance of funds within a financial account associated with the credit card or debit card typically must be sufficient to cover the purchase amount or the transaction can not be processed. When the transaction is paid for with a credit card or debit card, the sales attendant at the point-of-sale terminal must typically obtain an authorization for the charge from the card's issuing bank or from a clearinghouse.

During this checkout time and continuing through the time the authorization is being processed, the customer is more receptive to the merchant at the point-of-sale while the transaction is completed. Realizing this, many merchants leverage this opportunity by providing so-called "impulse items" at or near the point-of-sale. Such impulse items usually include high-margin, attractively-packaged goods such as magazines or candy. These items are strategically placed so that a customer may be induced to purchase such items at the last minute. Although such tactics have proven effective for some merchants, by utilizing a customer's checkout time to the merchant's full advantage, incremental sales and profits resulting therefrom could be realized.

In addition, many retail establishments fail to take full advantage of their day-to-day interactions with customers by not actively seeking their customer's opinions regarding quality of service and/or products offered. This is not to say that merchants generally regard customer opinions as valueless. To the contrary, many merchants provide suggestion boxes, survey forms or the like within the merchant's establishment. For example, in a restaurant environment, a merchant may leave a survey form on a table in an attempt to ascertain a customer's opinion regarding a dining experience. However, such means for gathering data are susceptible to employee tampering and furthermore, provide no incentive for the customer to complete the survey.

In the example provided, the survey form left on the table may easily be intercepted and discarded by a service personnel member who does not wish for the customer's opinion to be known by a manager. Similarly, a franchisee may neglect to inform a franchisor of negative customer perceptions regarding the franchisee. In light of such facts, many customers within the retail environment regard the means by which their opinion can be heard or addressed as inadequate. Additionally, many customers view such procedures as providing no immediate benefit or remedy. In short, customers are simply not motivated to fill out surveys or write out opinions regarding their perception of a retailer's performance. If retailers were able to more effectively gather information regarding customers' shopping experiences, retail store owners, managers and franchisors could more effectively address customer concerns, thereby ensuring higher rates of customer satisfaction and customer retention.

In an attempt to increase sales as well as satisfy the demands that customers may have after making a purchase, many retailers offer supplementary product enhancements such as warranties. In many cases, the process whereby a customer is offered and/or sold a warranty is left up to sales attendants at the point-of-sale. Store owners and management personnel are often unaware of whether or not each customer who qualifies for such an enhancement is in fact being presented with its proposal. For example, a sales attendant may neglect to inform a customer of an available product enhancement, such as a warranty, parts sold separately, or other necessary replacement components currently on sale. By consistently offering every qualified customer a supplementary product enhancement or supplemental product which he may find necessary or desirable, retailers could effectively increment purchase totals and thus profits.

As a proposed solution to the latter stated problem, U.S. patent application Ser. No. 08/994,426, entitled "METHOD AND APPARATUS FOR PROVIDING SUPPLEMENTARY PRODUCT SALES TO A CUSTOMER AT A CUSTOMER TERMINAL" filed Dec. 19, 1997, discloses a system and method whereby a customer at a point-of-sale terminal is provided with one or more supplemental product offers. The supplemental product offer is transmitted from a central controller directly to a card authorization terminal and displayed to the customer at the customer terminal. During this process, the customer is prompted to enter an "accept" or "decline" signal in response to the supplemental product offer. This signal is then transmitted back to the central controller and the customer transaction is consummated accordingly.

One immediate benefit of the invention disclosed in U.S. patent application Ser. No. 08/994,426 is the ability to effectively remove the sales attendant from the responsibility of providing the supplemental product offer. Although the disclosed invention can provide an effective means for providing supplementary product sale opportunities to customers in a retail environment, further advantages may be realized by processing a supplementary product sale through alternate methods.

Therefore, a need exists for a transaction processing method and apparatus operable to allow retail organizations to more effectively leverage a customer's time and attention at the point-of-sale. By doing so, retailers as well as customers could realize added benefits beyond those obtained through conventional means.

SUMMARY OF THE INVENTION

It is an object of the present invention to provide a method and apparatus operable to process a credit card transaction in a manner which provides a customer the opportunity to receive one or more charge enhancement offers on a record of charge provided at a point-of-sale terminal. The charge enhancement offers may correspond to either a reduction or an increase in the customer purchase amount.

According to an aspect of the present invention, a computer controlled by a clearinghouse receives from a merchant point-of-sale terminal a request for authorization of a purchase amount. The purchase amount is to be paid from a financial account (e.g. a credit card account) of a customer. The clearinghouse determines a "charge enhancement" offer based on the received request. The offer may be determined from one or more factors including the transaction information input at the merchant point-of-sale terminal or the customer's credit history. The clearinghouse computer transmits an authorization for the transaction to the merchant point-of-sale terminal. The clearinghouse computer also transmits the charge enhancement offer to the merchant point-of-sale terminal, which in turn prints on a record of charge indicia representing the offer. In one embodiment, the customer may accept the charge enhancement offer by, for example, signing a separate signature line printed on the record of charge.

BRIEF DESCRIPTION OF THE DRAWINGS

FIGS. 5A and 5B each illustrate an exemplary embodiment of an inventory database stored by the merchant server of FIG. 3;

FIG. 6 illustrates an exemplary transaction database stored by the merchant server of FIG. 3;

FIG. 8 illustrates an exemplary transaction database stored by the clearinghouse server of FIG. 4;

DETAILED DESCRIPTION OF THE PREFERRED EMBODIMENTS

Figure 1:
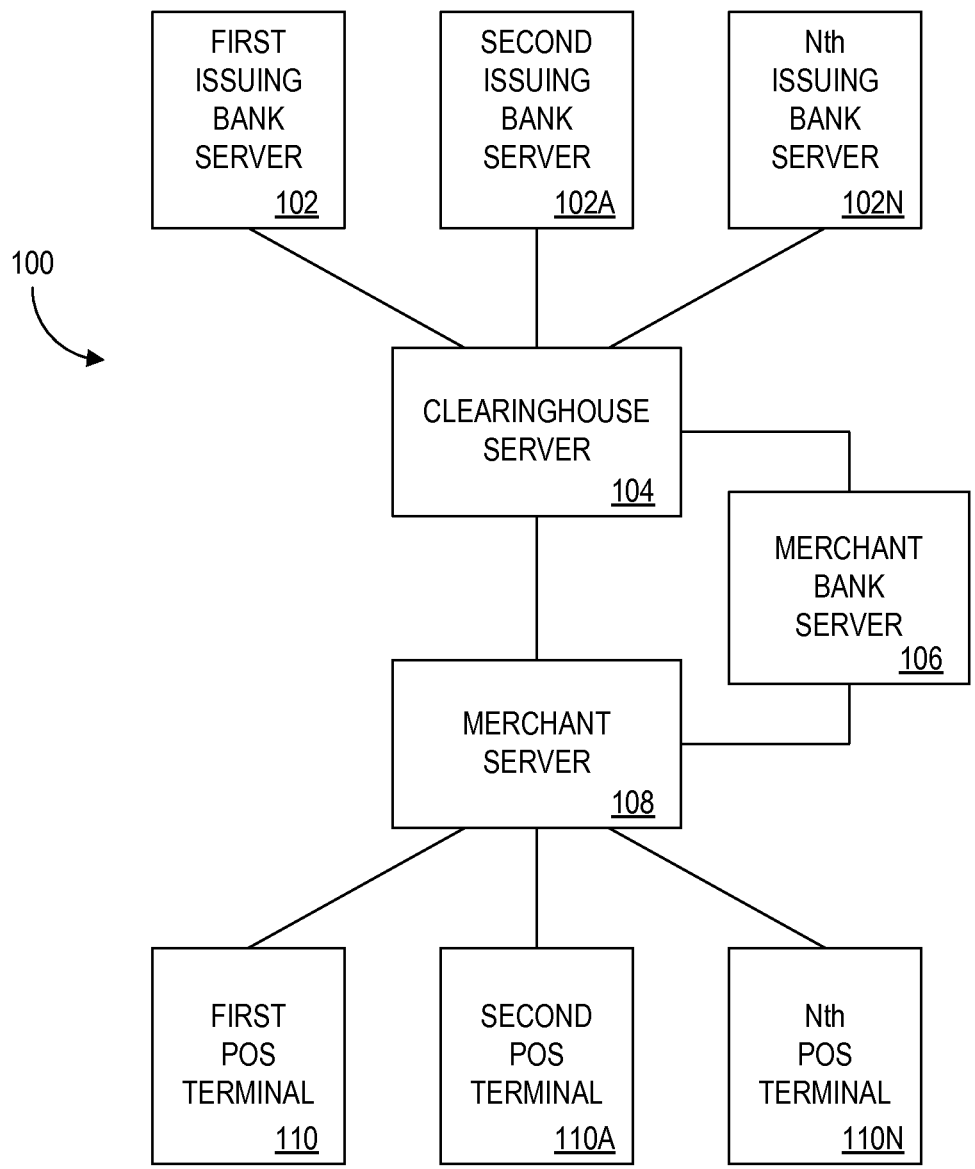
FIG. 1 is a block diagram illustrating a network environment suitable for implementing the present invention.

Presently, credit card processing networks allow a merchant to transmit a request for purchase authorization and a financial account identifier to a clearinghouse server in order to process a transaction between a customer and the merchant. The clearinghouse server confirms that the amount of credit available in the financial account is sufficient to accommodate the purchase amount. If the account is in good standing, the clearinghouse server transmits an authorization for the transaction back to the merchant. Transaction information is printed out for the customer on a record of charge. The customer is required to sign the record of charge to facilitate completion of the transaction. The merchant then provides the signed record of charge to a clearinghouse or an issuing bank in order to facilitate receipt of the purchase amount indicated on the record of charge.

As disclosed herein, the present invention involves providing customers with one or more charge enhancement offers at a merchant's point-of-sale terminal. Such offers are preferably presented to the customer on a printed record of charge which reflects both the purchase amount and the charge enhancement offer being provided. In addition, it is preferable that separate signature lines be provided for (i) the original purchase amount and (ii) the adjusted purchase amount in light of the charge enhancement offer, so that a customer's acceptance of the offer is apparent and distinguished from the customer merely acknowledging the original purchase amount. Furthermore, the charge enhancement offer is preferably an offer wherein the acceptance of which may result in either a credit toward or a charge against the customer's financial account, depending on the type of charge enhancement offer. In one embodiment, the charge enhancement offer is not processed with respect to the customer's account until the clearinghouse or issuing bank receives a copy of the signed record of charge and confirms the customer's acceptance of the offer.

Offers for charge enhancement may include any of the following types of promotions. The following list of offer types, however, is not exclusive. Generally, offers may come in three varieties: (i) surveys or questionnaires, (ii) supplementary product sales or product enhancements and (iii) cross-subsidy offers. Again, each of these offers for charge enhancement are contemplated to be provided on a record of charge output to a customer at the point-of-sale during a transaction with a merchant.

Surveys and questionnaires are provided to a customer so that a merchant may obtain feedback on its products or services. The survey or questionnaire contains one or more questions in response to which the customer may be obligated to, for example, write out an answer or fill in a checkbox. An example of this type of charge enhancement offer is provided in FIG. 11. In exchange for completing the survey, the customer may receive a predetermined benefit, such as an amount of credit towards the purchase amount of the transaction. That amount of credit is added to the customer's financial account (e.g. subtracted from the balance of a credit card account) after it is confirmed that the customer has completed the survey and provided his signature as an indication of acceptance of the offer. A clearinghouse or issuing bank may be compensated for the credit provided to the customer by charging the merchant for the amount credited to the customer.

As an alternative to providing surveys pertaining solely to the merchant, a survey may request information about a third party's products or services, such as the service provided by the issuing bank that maintains the customer's account. In this instance, the third party rather than the merchant may provide compensation for the credited amount provided for completing the survey. In addition, the third party may pay a fee to the merchant in exchange for the merchant providing the offer to the customer.

Another type of offer, supplemental product sales and product enhancements, is provided to the customer in the form of an offer to purchase a supplemental product or service. For example, a product enhancement type offer may include an offer to purchase a warranty for a product involved in the current transaction. The supplemental product or product enhancement may be provided by the merchant, or, by the issuing bank associated with the customer financial account. If the customer accepts, his financial account will be charged for the price of the supplemental product or product enhancement in addition to the original purchase total. In the case where the offer is for a supplemental product, the supplemental product may be provided to the customer at the time of sale or may be shipped or otherwise made available to the customer after the acceptance of the offer is confirmed. An example of an offer for a supplemental product or service is given in FIG. 12.

Yet another type of charge enhancement offer, a cross-subsidy offer, involves the provision of a benefit such as a discount toward the customer's purchase amount in exchange for the customer's acceptance of an offer by a third party (i.e. a party other than the customer and the merchant). For example, the cross-subsidy offer may include an offer to receive a discount of the entire purchase amount in exchange for the customer's obligation to change long distance telephone service providers from a current service provider to the long distance telephone service provider indicated in the offer. Other types of cross-subsidy offers include, but are not limited to, Internet service, banking services, credit card account services, insurance service, securities trading service, utilities service, satellite television service, or cable television service offers. An example of a cross-subsidy offer in accordance with the present invention is provided in FIG. 13.

In addition, in an embodiment suitable for restaurant environments, the product enhancement may include a final purchase total including the addition of a percentage increase of the original purchase total. Such percentage increase may represent, for example, a gratuity amount to be included in the final purchase total of the transaction. When a customer accepts this offer, the final purchase total will include the original purchase total in addition to the percentage increase selected by the customer. For example, the customer may indicate acceptance of the offer by signing or initialing an appropriate area of the record of charge associated with the additional percentage increase. An example of this variety of charge enhancement offer is provided in FIG. 14.

The instant invention may be easily practiced on existing credit card transaction processing networks. That is, although some programming adjustments may be needed to implement the present invention, it may be practiced without the need for additional equipment. The instant invention may also be incorporated as part of future credit and debit card transaction processing networks.

It is contemplated that the present invention may be implemented on a computer network 100 such as that depicted in FIG. 1. Multiple merchant point-of-sale (POS) terminals 110, 110A and 110N are shown operatively connected to merchant server 108. Although three terminals are shown, one of ordinary skill in the art will readily appreciate that more or fewer terminals may be operatively connected to merchant server 108. It will also be readily appreciated that more than one merchant server 108 may be included. In the configuration shown, POS terminals 110, 110A and 110N are operatively connected to merchant server 108 in order to transmit transaction information corresponding to sales between the merchant and a plurality of customers. Such transaction information may include the product identifiers of products included in the transaction, and payment information such as a financial account identifier. Merchant server 108 may perform such tasks as updating product inventory as well as processing received payments with financial institutions, as described further herein below.

The connection between POS terminals 110, 110A and 110N may be accomplished via one or more of a local area network (LAN), wide area network (WAN), dedicated telephone line, wireless connection, an intranet or the Internet. The preferred network connection will depend on the type of merchant establishment involved. For example, if the merchant operates from a single retail establishment, it is contemplated that POS terminals 110, 110A and 110N will be connected to merchant server 108 via a local area network. If the merchant operates several retail establishments in several different locations, it is contemplated that the connection may be made via a wide area network or an intranet. Furthermore, if the merchant operates his business on the Internet, it is contemplated that the merchant server 108 may store and run a Web site suitable for selling products and/or services. In such an embodiment, POS terminals 110, 110A and 110N may be one or more personal computers owned and operated by customers rather than the merchant.

Merchant server 108, in turn, is operatively connected to clearinghouse server 104. In a typical arrangement, the merchant which operates merchant server 108 is a separate entity from the clearinghouse which operates clearinghouse server 104. The clearinghouse represents an entity, such as NYCE, CIRRUS or FIRST DATA CORP. that receives requests to process credit card and/or debit card transactions, communicates with the issuing banks that manage the accounts associated with such cards and provides an authorization for a transaction if the subject account is in good standing. It is contemplated that merchant server 108 and clearinghouse server 104 are connected via a dedicated telephone line, as is commonplace in the field of credit card transaction processing. Furthermore, it is contemplated that merchant server 108 may be connected to a plurality of clearinghouse servers.

Clearinghouse server 104 is operatively connected to a plurality of issuing bank servers 102, 102A and 102N. Although only three such servers are shown, one of ordinary skill in the art will readily appreciate that either more or fewer issuing bank servers may be accommodated by the configuration shown in FIG. 1. As described above, clearinghouse server 104 is operatively connected to the plurality of issuing bank servers 102-102N in order to confirm that financial accounts managed by the issuing banks are in good standing, that is, whether a subject financial account managed by the issuing bank (i) actually exists and (ii) has enough funds to accommodate a requested transaction. The information regarding customer financial accounts may be communicated between the issuing bank server 102 and the clearinghouse server 104 at the time of the transaction or may be communicated, for example, at the beginning or end of each business day.

Merchant server 108 is also optionally networked to merchant bank server 106 so that the merchant may exchange certain payment information with its bank. It is contemplated that merchant server 108 communicates via dedicated telephone line to merchant bank server 106 through which merchant server 108 may transmit information to and receive information from merchant bank server 106.

Furthermore, merchant bank server 106 may be one of the issuing banks operating in conjunction with clearinghouse server 104. Thus, clearinghouse server 104 may communicate with merchant bank server 106 in a similar manner and for the purposes described above with regard to issuing bank servers 102-102N.

Figure 2:
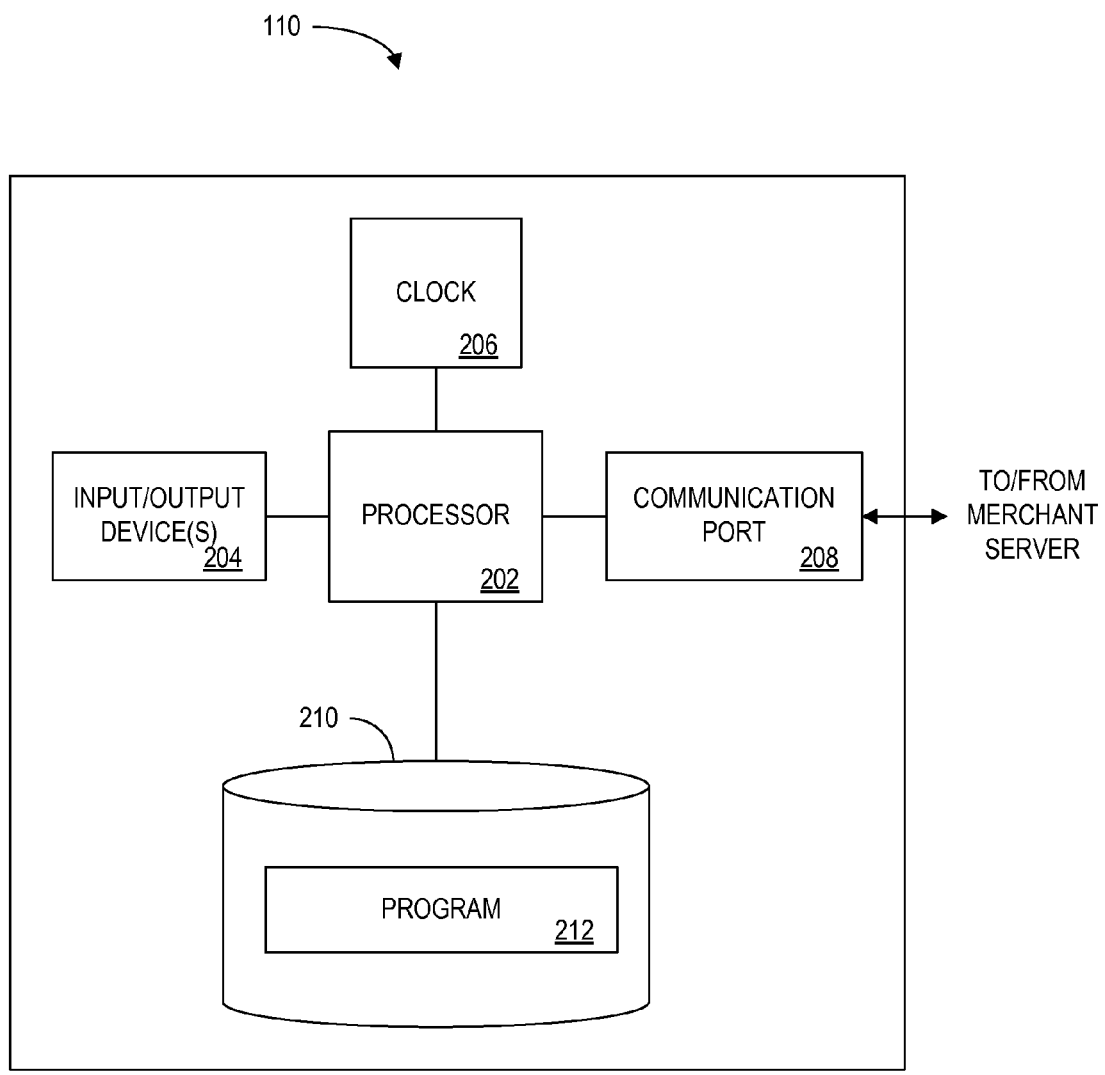
FIG. 2 is a block diagram illustrating an exemplary point-of-sale terminal of FIG. 1.

Referring now to FIG. 2, a preferred POS terminal 110, representative of any or each of POS terminal 110, 110A and/or 110N includes the following components: processor 202, input/output device(s) 204, clock 206, communication port 208 and data storage device 210, which stores program 212. POS terminal 110 may be any personal computer, cash register, card authorization terminal or combination thereof which is operable to receive a credit and/or debit card number and output a printed record of charge according to a customer purchase total. Examples of such terminals include the ICL RETAIL SYSTEMS TeamPOS™ 5000 or the OMNI™ 3200 credit card authorization terminal manufactured by VERIFONE®, INC.

POS terminal 110 is controlled by processor 202 which may be one or more commonly manufactured microprocessor chips, such as the PENTIUM® III manufactured by INTEL® CORPORATION. Processor 202 may receive a clock signal from clock 206 to which processor 202 is operatively connected. The clock signal may indicate a date and time to the processor 202.

Data storage device 210 may include random access memory (RAM) and/or read-only memory (ROM). RAM may be one or more single inline memory module (SIMM) chips capable of storing a predetermined amount of data (typically measured in megabytes), and is used by processor 202 for temporary storage of processing instructions during operation of POS terminal 110. Read-only memory (ROM) is at least one permanent non-erasable and non-rewritable memory chip that stores initializing instructions to be used by processor 202 during, for example, a start-up routine performed by POS terminal 110. Further functions of random access memory (RAM) and read-only memory (ROM) will be apparent to one of ordinary skill in the art.

The data storage device 210 may also or alternately include one or more of the following commonly known computer peripherals used for storing computer data: a hard drive, a floppy disk drive, a DVD drive such as those manufactured by Phillips™ Electronics, a ZIP® drive such as those manufactured by IOMEGA®, a tape drive, a Digital Audio Tape drive and/or any combination of the same or equivalents thereto. Further such devices will be apparent to one of ordinary skill in the art.

Data storage device 210 is operative to store program 212 which may include an operating system and/or one or more application programs, each operative to successfully control POS terminal 110 in accordance with the systems and methods of the present invention.

Processor 202 is further operatively connected to input/output device(s) 204 which may include: a display device, a keyboard, a mouse, a touchscreen, a speech recognition unit, a scanning device, a card processing unit, a printer or any combination of the foregoing. Input/output devices 204 operate to allow a merchant sales attendant to input information into POS terminal 110 in order to process a transaction with a customer. Further input/output devices 204 allow the output of a printed record of charge which acts both as a receipt for a customer and which may allow a customer to accept a charge enhancement offer as is described below.

Processor 202 is further operatively connected to communication port 208, which may be one or more of the following commonly known computer peripherals used for computer-related communications: a parallel port, a serial port, a network card, a fax/modem/telephone port or any combination of the same. Communication port 208 is operatively connected to facilitate the transfer of transaction information between processor 202 and merchant server 108.

Figure 3:
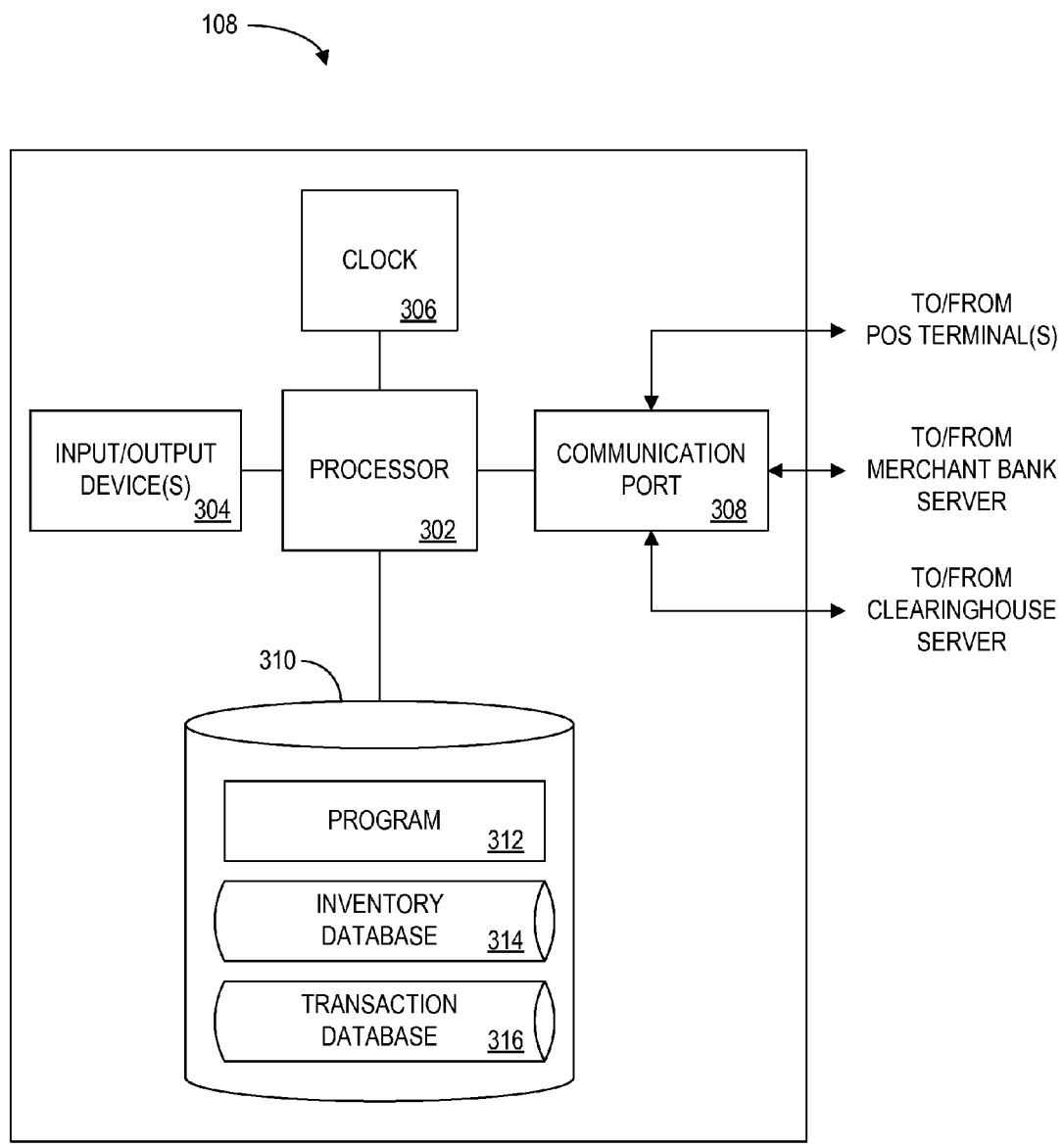
FIG. 3 is a block diagram illustrating an exemplary merchant server of FIG. 1.

Referring now to FIG. 3, a preferred merchant server 108 includes the following components: processor 302, input/output devices 304, clock 306, communication port 308 and data storage device 310, which stores program 312, inventory database 314, and transaction database 316.

Processor 302 may be one or more commonly manufactured microprocessor chips, such as the PENTIUM® III manufactured by INTEL® CORP. Processor 302 may receive a clock signal from clock 306. The clock signal can indicate a date and time to processor 302.

The data storage device 310 may include random access memory (RAM) and read-only memory (ROM). RAM may be one or more single inline memory module (SIMM) chips capable of storing a predetermined amount of data (typically measured in megabytes), and is used by processor 302 for temporary storage of processing instructions during operation of merchant server 108. Read-only memory (ROM) is at least one permanent non-erasable and non-rewritable memory chip that stores initializing instructions to be used by processor 302 during, for example, a start-up routine performed by merchant server 108. Further functions of random access memory (RAM) and read-only memory (ROM) will be apparent to one of ordinary skill in the art.

The data storage device 310 may include one or more of the following commonly known computer peripherals used for storing computer data: a hard drive, a floppy disk drive, a DVD drive such as those manufactured by Phillips™ Electronics, a ZIP® drive such as those manufactured by IOMEGA®, a tape drive, a Digital Audio Tape drive and/or any combination of the same or equivalents thereto. Further such devices will be apparent to one of ordinary skill in the art.

Data storage device 310 is operative to store program 312 which may include an operating system as well as one or more application programs, each operative to successfully control merchant server 108 in accordance with the systems and methods of the present invention. Data storage device 310 is further operative to store an inventory database 314, and a transaction database 316, each discussed further below with reference to FIGS. 5A-6.

Processor 302 is further operatively connected to input/output devices 304 which may include: a display device, a keyboard, a mouse, a touchscreen, a speech recognition unit, a scanning device, a card processing unit, a printer and/or any combination of the foregoing. Input/output devices 304 operate to allow a merchant to input information to and output information from merchant server 108 in order to monitor merchant business operations, such as inventory management and the like. Processor 302 is further operatively connected to communication port 308, which may be one or more of the following commonly known computer peripherals used for computer-related communications: a parallel port, a serial port, a network card, a fax/modem/telephone port and/or any combination of the same. Communication port 308 is operatively connected to facilitate the transfer of data between processor 302 and POS terminals 110-110N, clearinghouse server 104, and/or merchant bank server 106 as may be necessary.

Figure 4:
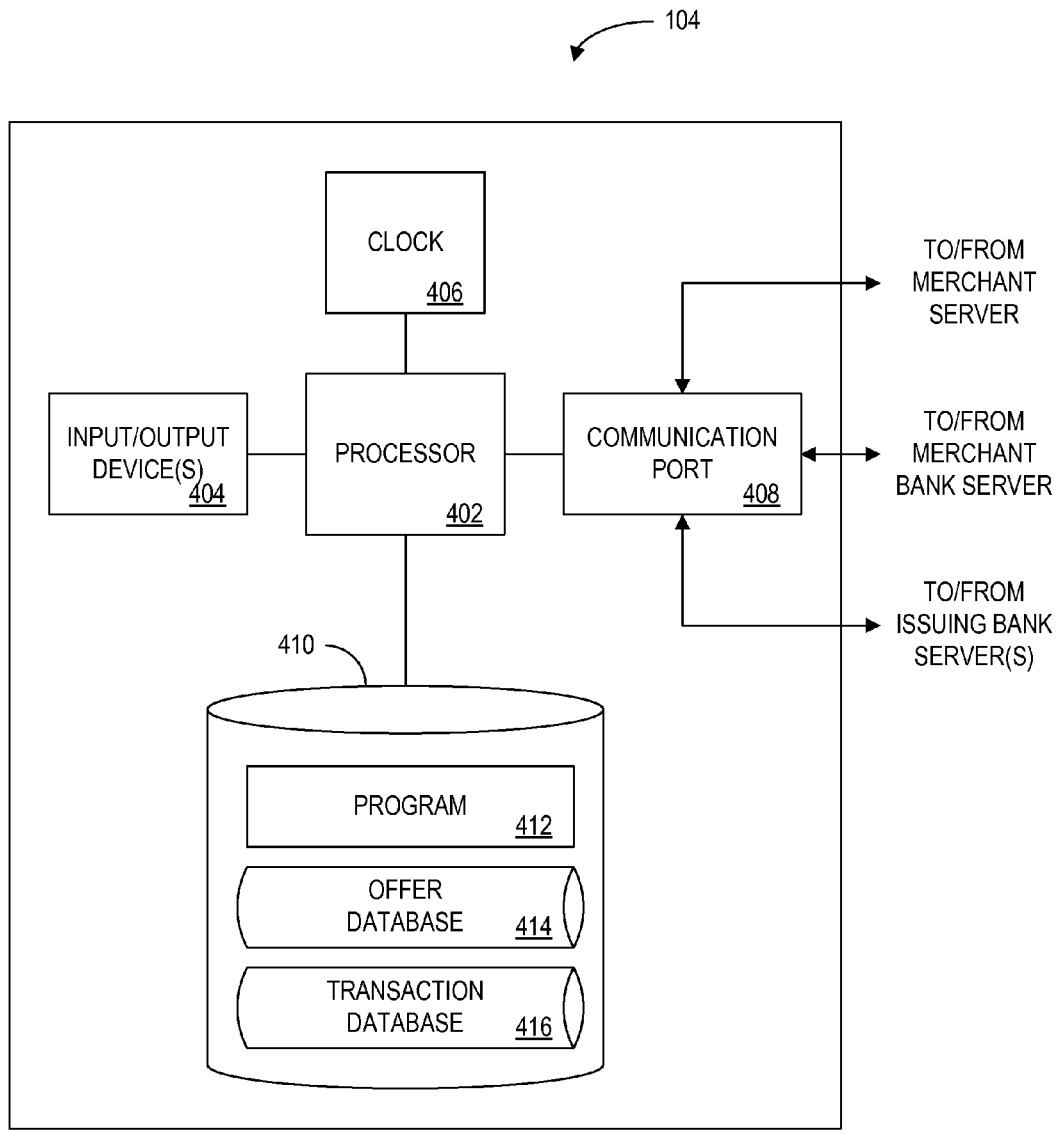
FIG. 4 is a block diagram illustrating an exemplary clearinghouse server of FIG. 1.

Referring now to FIG. 4, a preferred clearinghouse server 104 includes the following components: processor 402, input/output device(s) 404, clock 406, communication port 408 and data storage device 410, which stores program 412, offer database 414 and transaction database 416. Processor 402 may be one or more commonly manufactured microprocessor chips, such as the PENTIUM® III manufactured by INTEL® CORP. Processor 402 may receive a clock signal from clock 406. The clock signal can indicate a date and time to processor 402.

The data storage device 410 may include random access memory (RAM) and/or read-only memory (ROM). RAM may be one or more single inline memory module (SIMM) chips capable of storing a predetermined amount of data (typically measured in megabytes), and is used by processor 402 for temporary storage of processing instructions during operation of clearinghouse server 104. Read-only memory (ROM) is at least one permanent non-erasable and non-rewritable memory chip that stores initializing instructions to be used by processor 402 during, for example, a start-up routine performed by clearinghouse server 104. Further functions of random access memory (RAM) and read-only memory (ROM) will be apparent to one of ordinary skill in the art.

The data storage device 410 may be any one of the following commonly known computer peripherals used for storing computer data: a hard drive, a floppy disk drive, a DVD drive such as those manufactured by Phillips™ Electronics, a ZIP® drive such as those manufactured by IOMEGA®, a tape drive, a Digital Audio Tape drive and/or any combination of the same or equivalents thereto. Further such devices will be apparent to one of ordinary skill in the art.

Data storage device 410 is operative to store program 412 which may include an operating system as well as one or more application programs, each operative to successfully control clearinghouse server 104 in accordance with the systems and methods of the present invention. Data storage device 410 is further operative to store an offer database 414, and a transaction database 416, each discussed further below with reference to FIGS. 7 and 8, respectively.

Processor 402 is further operatively connected to input/output device(s) 404 which may include: a computer monitor, a keyboard, a mouse, a touchscreen, a speech recognition unit, a scanning device, a card processing unit, a printer and/or any combination of the foregoing. Input/output device(s) 404 operate to allow a clearinghouse agent to input information to and output information from clearinghouse server 104, such as transaction processing information and the like. Processor 402 is further operatively connected to communication port 408, which may be one or more of the following commonly known computer peripherals used for computer-related communications: a parallel port, a serial port, a network card, a fax/modem/telephone port and/or any combination of the same. Communication port 408 is operatively connected to facilitate the transfer of data between processor 402 and issuing bank servers 102-102N, merchant server 108, and/or merchant bank server 106 as may be necessary.

Figure 5A:

FIGS. 5A and 5B each show an exemplary embodiment of the inventory database 314. In particular, each embodiment is directed to a different type of merchant. FIG. 5A represents data that a merchant operating a restaurant may store in inventory database 314. FIG. 5B represents data that a merchant operating, for example, a consumer electronics retail store may track in inventory database 314. In referring to FIGS. 5A-8, it should be noted that each row of the databases depicted therein corresponds to a record of that database.

Inventory database 314 includes the following fields: product identifier field 502 and 512, product descriptor field 504 and 514, product price field 506 and 516, product class field 508 and 518 and available quantity field 510 and 520. Inventory database 314 is used to track products and/or services that are in a merchant's inventory and may be purchased by consumers visiting the merchant's establishment.

For each record of inventory database 314, product identifier fields 502 and 512 preferably contain data representing a unique identifier for a product in the merchant's inventory. The product identifier may be any alphanumeric, numeric or other type of code. The product identifier may be selected by the merchant or may correspond to a serial number assigned to a product by the product's manufacturer. The product identifier may further be presented on the product's packaging in a scanner-readable format so that upon presentation at a merchant POS terminal 110, the sales attendant may scan in the data to initiate the sale of the product. For example, the unique identifier may comprise data representing a Universal Product Code (UPC) or bar code.

For each record of inventory database 314, product descriptor fields 504 and 514 preferably contain a description of each product in the merchant's inventory. The descriptor may be selected by the merchant or may be a trade name or trademark of the product. During a sale of the product, this descriptor may be printed out by POS terminal 110 on a record of charge presented to a customer upon completion of the sale.

For each record of database 314, product price fields 506 and 516 preferably contain a retail price or unit price of a product in the merchant's inventory. The product price may be determined by the merchant and may change over time. Upon scanning the product during a sale, POs terminal 110 may transmit the product identifier to merchant server 108. In turn, merchant server 108 may transmit the price to POS terminal 110 in order to calculate a total or subtotal amount for the sale. Alternatively, or in conjunction with the foregoing, the price of the product may be presented in a scanner-readable format on the product's packaging.

For each record of database 314, product class fields 508 and 518 preferably contain data representing a product class of the subject product. The product class may be representative of a group of related products and may comprise an identifier assigned by the merchant.

For each record of database 314, available quantity fields 510 and 520 preferably contain data representing a numeric amount of the corresponding product remaining in a merchant's inventory. This data may be updated after each transaction involving the product is completed. For example, when a merchant POS terminal reports a sale of a product to merchant server 108, the available quantity of the product listed in field 510 or 520 may be debited by the quantity of product sold during the transaction. Conversely, the data listed in available quantity fields 510 and 520 may reflect an increase when a merchant re-stocks the product. Other uses of this field will be apparent to one of ordinary skill in the art.

Referring to FIG. 6, an embodiment of transaction database 316 stored in data storage device 310 of merchant server 108 includes the following fields: transaction identifier field 602, customer identifier field 604, transaction time/date field 606, POS terminal identifier field 608, product(s) purchased field 610, original purchase total field 612 and final purchase total field 614. Transaction database 316 is operative to store a record for each transaction that occurs at a merchant's establishment.

Accordingly, for each transaction completed at a merchant's establishment, transaction identifier field 602 preferably contains a unique identifier. The identifier may be any alphabetic, numeric, alphanumeric or other type of code which uniquely identifies a transaction. The transaction identifier is contemplated to be generated by merchant server 108 upon receipt of transaction information. In particular, a first transaction performed at a merchant's establishment may be assigned a first code, such as "T 98765." The next received transaction identifier may be the next incremental number, i.e. "T 98766." However, it will be apparent to one of ordinary skill in the art that virtually any numbering system which uniquely identifies each transaction will be appropriate.

The code may further be generated based on the type of transaction involved. For example, one type of code (such as the type provided in the figures) may be employed for credit or debit card transactions and another type (not shown) for cash transactions. In this manner, a merchant may later access the transaction database 316 and survey credit or debit card transactions in an easier manner.

For each record of transaction database 316, customer identifier field 604 preferably contains an identifier corresponding to the customer involved in the transaction. It is contemplated that the customer identifier will correspond to a financial account number or a card number of a credit or debit card used to pay the purchase amount. However, for other types of transactions, such as cash transactions, the word "CASH" or another non-unique, generic identifier may be used.

For each record of transaction database 316, transaction time/date field 606 preferably contains a time and a date that the subject transaction with the customer was completed. This information may be used to more easily locate records that need to be adjusted after completion of the transaction and in accordance with the present invention. Alternatively, it is contemplated that only the date of the transaction may be stored.

For each record of transaction database 316, POS terminal identifier field 608 preferably contains an identifier corresponding to the POS terminal 110 that processed the subject transaction.

For each record of transaction database 316, product(s) purchased field 610 preferably contains, for each record, a list of product identifiers corresponding to products that were sold in the subject transaction. A description of the product identifiers used has been discussed above regarding FIGS. 5A and 5B.

Original purchase total field 612 preferably contains, for each record of transaction database 316, the original purchase total authorized against the customer's financial account during the transaction. The totals listed here may include any sales tax associated with the transaction or may be the subtotal amount of the products purchased. Final purchase total field 614, on the other hand, contains, for each record of transaction database 316, the final purchase amount charged to the customer financial account. The final purchase total represented in field 614 may exceed or be less than the original purchase total represented in field 612 depending on the variety of charge enhancement offers provided. For example, if the charge enhancement offer provided to the customer indicated that the customer may receive a discount toward an original purchase total in exchange for providing feedback to a merchant regarding the merchant's products or service, final purchase total field 614 may reflect a value less than that stored in the original purchase total field 612 of the corresponding record. Conversely, if the charge enhancement offer provided to the customer indicated that the customer may purchase a supplemental product or product enhancement, final purchase total field 614 may reflect a value greater than that stored in the original purchase total field 612 of the corresponding record. Lastly, if a charge enhancement offer is not provided, or, if the customer refuses the offer of charge enhancement, the final purchase total field 614 may reflect a value equal to that stored in the original purchase total field 612 of the corresponding record. The processes by which the original and final purchase totals are calculated and stored are discussed below in conjunction with FIGS. 9-10B.

Figure 7:
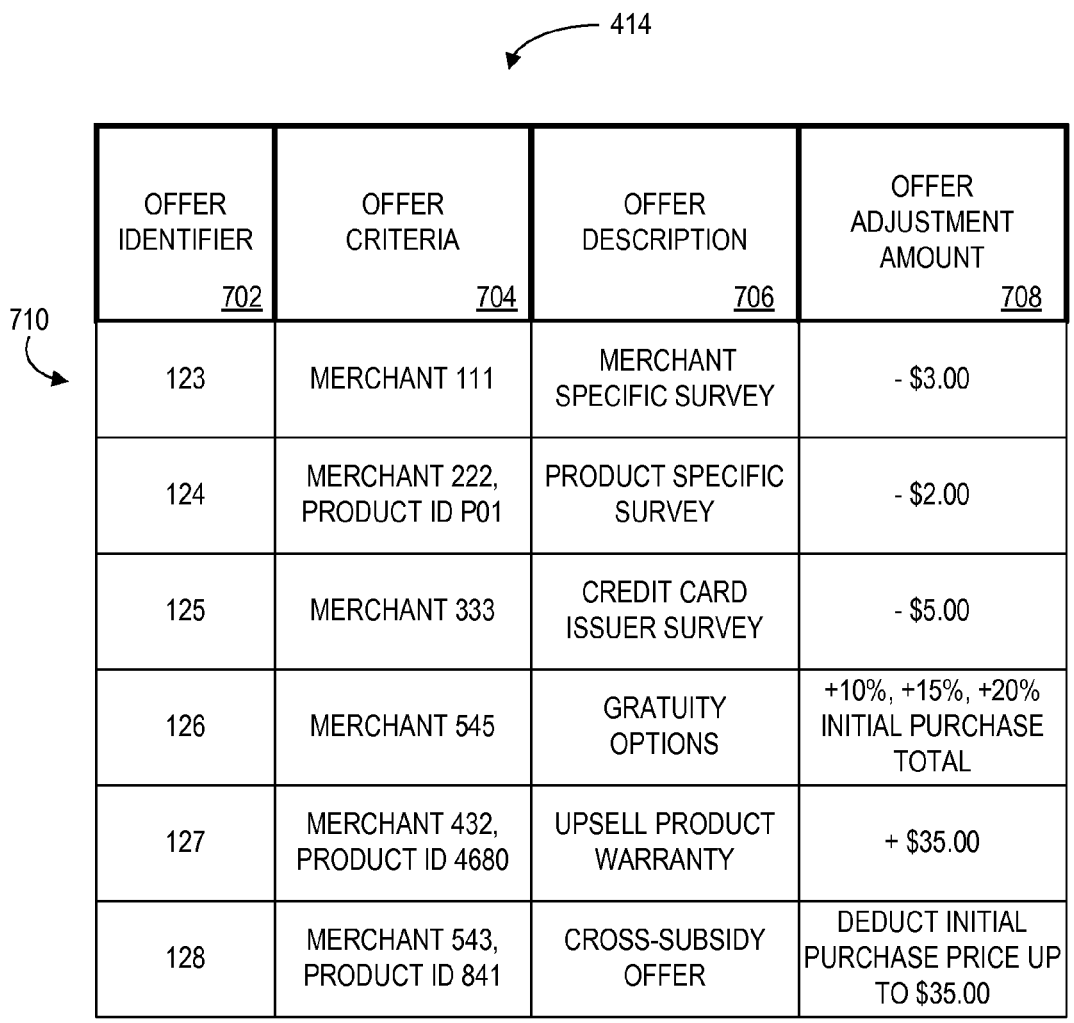
FIG. 7 illustrates an exemplary offer database stored by the clearinghouse server of FIG. 4.

As displayed in FIG. 7, an embodiment of offer database 414 stored in data storage device 410 of clearinghouse server 104 includes the following fields: offer identifier field 702, offer criteria field 704, offer description field 706 and offer adjustment amount field 708. Offer database 414 is operative to store data representing a plurality of offers to be presented to customers in accordance with the instant invention. In operating the present invention, when clearinghouse server 104 receives transaction information and a request for authorization to charge a purchase amount to a customer's financial account, clearinghouse server 104 will compare the received transaction information to the contents of offer database 414 to determine an appropriate offer to be presented to the customer on a printed record of charge.

Although offer database 414 is preferably maintained by clearinghouse server 104, it is contemplated that one or more of the plurality of issuing banks 102-102N may store and maintain this information in place of clearinghouse server 104. It is further contemplated that merchant server 108 may store and maintain this information in place of clearinghouse server 104.

For each record of offer database 414, offer identifier field 702 preferably contains data representing a unique identifier corresponding to an offer to be presented to a customer on a printed record of charge. The identifier may be any alphabetic, numeric, alphanumeric or other type of code which uniquely identifies an offer. It is contemplated that the clearinghouse assigns the offer identifier. However, other entities such as a merchant or an issuing bank may generate the offer identifier and provide it to the clearinghouse.

For each record of offer database 414, offer criteria field 704 preferably contains data representing one or more criteria pertaining to conditions that must be met in order for the offer to be provided to a customer on a printed record of charge. For example, and in reference to the first record 710 of FIG. 7, one type of offer criteria may specify that all transaction authorizations corresponding to a particular merchant (e.g. merchant 111 according to record 710) may qualify to include the offer identified as offer "123". Other types of offer criteria may include, but are not limited to, a product that is being purchased, a minimum purchase amount for a transaction, a date the transaction is being initiated, or an amount of credit available within the customer financial account. If the offer is conditioned upon the customer's available credit, it is further contemplated that higher priced supplementary product offers as described herein will only be available to those customers whose available credit equals or exceeds the price of the supplementary product.

For each record of offer database 414, offer description field 706 preferably contains a description of the offer corresponding to the offer identifier. The description may be a general description of the offer, as is displayed in FIG. 7. However, it is contemplated that this field may contain a pointer to a file containing data to be output on a record of charge. It is also contemplated that data representing the text of the offer may be stored in this field, transmitted to merchant server 108 along with an authorization for the transaction and output to a customer on a printed record of charge.

For each record of offer database 414, offer adjustment amount field 708 preferably contains data representing an amount by which the customer's original purchase total will be adjusted if the customer accepts the charge enhancement offer. This amount may either be positive (i.e. an additional charge) or negative (i.e. a credit towards the purchase amount) depending on the type of offer involved. For example and as illustrated at record 710 of FIG. 7, if the customer agrees to complete a merchant specific survey, that is, a survey requesting the customer's opinion regarding the merchant's products or services, the customer may receive a $3.00 credit toward the final purchase total. The offer adjustment amount may also be a percentage discount off the original purchase total or a provision of alternate currency such as any number of frequent flier miles, an amount of pre-paid telephone time, merchant-specific currency vouchers and the like. Other offer adjustment amounts will be apparent to one of ordinary skill in the art.

As displayed in FIG. 8, an embodiment of transaction database 416 stored in data storage device 410 of clearinghouse server 104 includes the following fields: transaction identifier field 802, account identifier field 804, merchant identifier field 806, original purchase total field 808, charge adjustment amount field 810, final charge amount field 812 and posting time/date field 814. Transaction database 416 is operative to store transaction information regarding a plurality of requests to process credit card transactions. The requests may come from a plurality of merchants and involve accounts from a plurality of issuing banks.

Transaction identifier field 802 preferably contains data representing a unique identifier corresponding to each transaction for which transaction information is transmitted to clearinghouse server 104 for processing. The identifier may be any alphabetic, numeric, alphanumeric or other type of code which uniquely identifies a transaction. The transaction identifier is contemplated to be generated by clearinghouse server 104 upon receipt of transaction information. In particular, a first transaction received by the clearinghouse may be assigned a first code, such as "00946123." The next received transaction identifier may be the next incremental number, i.e. "00946124." However, it will be apparent to one of ordinary skill in the art that any system which uniquely identifies each transaction will be appropriate.

For each recorded transaction, account identifier field 804 preferably contains data representing a credit card or other financial account identifier that corresponds to an account from which a purchase amount is to be paid. Account identifier field 804 may further contain a listing of an issuing bank or the like which maintains the financial account. Alternatively, it is contemplated that the account identifier itself may contain information such as a prefix that identifies the appropriate issuing bank. For example, it is well known in the art that the first four digits of a credit card account number correspond to the bank which issued the card and maintains the account.

For each record of transaction database 416, merchant identifier field 806 preferably contains data representing a unique identifier corresponding to the merchant requesting authorization of the transaction. The identifier may be any alphabetic, numeric, alphanumeric or other type of code which uniquely identifies the corresponding merchant. It is contemplated that the merchant identifier is generated and assigned by the clearinghouse or an issuing bank after the merchant contracts to accept credit or debit card payments from an issuer.

For each record of transaction database 416, original purchase total field 808 preferably contains an indication of a purchase amount corresponding to the subject transaction. The amount is determined at a merchant point-of-sale terminal when the original purchase total is calculated.

For each record of transaction database 416, charge adjustment amount field 810 preferably contains an indication of the amount of an adjustment to the original purchase total that may be applied if a customer accepts a charge enhancement offer following authorization of the transaction. The amount shown in charge adjustment amount field 810 will correspond to the value stored in offer adjustment amount field 708 for the offer determined to be applicable toward the current transaction.

Final charge amount field 812 preferably contains, for each record of transaction database 416, an indication of a resulting purchase amount charged to the corresponding financial account following presentment of the offer of charge enhancement to the customer. As discussed above, this amount will be determined following completion of the merchant/customer portion of the transaction when the clearinghouse, issuing bank and/or merchant bank receive an indication of the customer response to the offer of charge enhancement on a copy of the record of charge.

For each record of transaction database 416, posting time/date field 814 preferably contains data representing a time and/or date at which clearinghouse server 104 received the indication of the final charge amount. Issuing bank servers 102-102N and/or merchant bank server 106 may provide this information. Alternately, clearinghouse server 104 may determine the information to be stored in posting time/date field 814 by way of clock 406 as described above with reference to FIG. 4. It is noted that information contained in posting time/date field 814 will necessarily be stored following completion of the merchant/customer portion of the transaction, upon receipt of an indication of acceptance of a charge enhancement offer as indicated by a record of charge in accordance with the present invention. Furthermore, it is contemplated that data representing only the date need be stored in posting time/date field 814.

Figure 9:
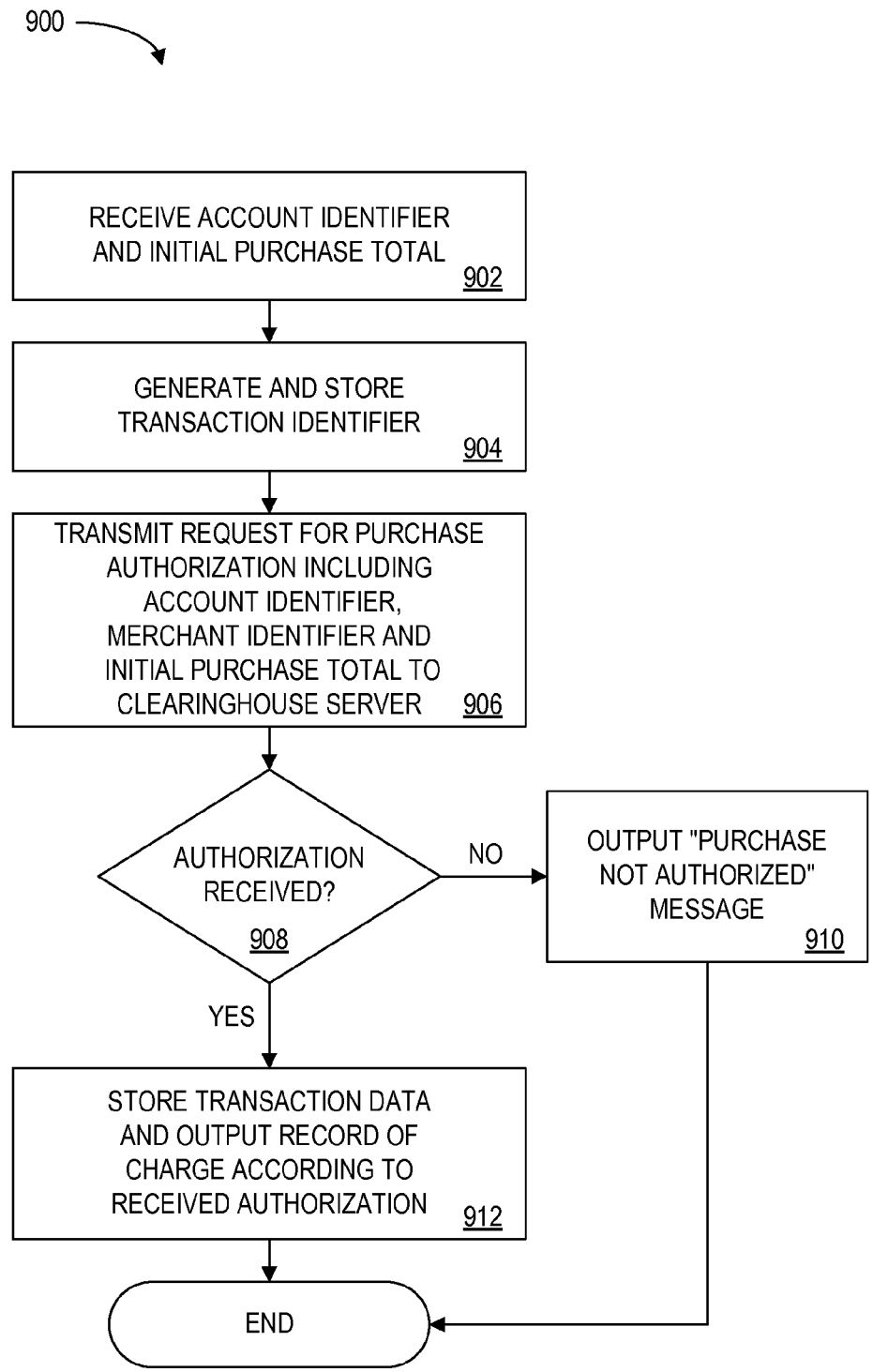
FIG. 9 is a flowchart illustrating an exemplary transaction process performed at a point-of-sale terminal.

As all the hardware and software that is involved in practicing the present invention have been introduced, it is necessary to examine the processes of completing a credit or debit card transaction and providing a charge enhancement offer as contemplated by the applicants. FIG. 9 illustrates a preferred process 900 performed by merchant server 108 to process a credit or debit card transaction between a customer and a merchant. Alternately, process 900 may be executed by any of POS terminals 110-110N in direct communication with clearinghouse server 104.

Process 900 begins when a sales attendant at a merchant POS terminal receives one or more products that a customer wishes to purchase. The original purchase total is calculated at the POS terminal and the customer presents a financial instrument, such as a credit or debit card bearing a financial account identifier which is read by or entered in to the terminal. Transaction information including the original purchase total and the financial account identifier is then transmitted from the POS terminal to merchant server 108 (step 902) which, in turn, generates a transaction identifier and stores the identifier and the transaction information in the appropriate record of transaction database 316 (step 904).

Merchant server 108 then generates and transmits to clearinghouse server 104 a request for authorization to process the original purchase total against the financial account corresponding to the received financial account identifier (step 906). The request may include transaction information such as the financial account identifier, the merchant identifier and an original purchase total. At step 908, the merchant server 108 determines if an authorization has been received from clearinghouse server 104. If so, process 900 continues on to step 912. If, however, after a predetermined amount of time an authorization is not received, merchant server 104 transmits a message to the POS terminal that the purchase has not been authorized (step 910) after which process 900 ends.

If it is determined during step 908 that an authorization has been received, merchant server 108 transmits the authorization to the POS terminal allowing the merchant/customer portion of the transaction to be completed. Merchant server 108 then stores the transaction data and the POS terminal outputs (e.g. prints) a record of charge including an indication of any received charge enhancement offers (step 912).

Figure 10A:
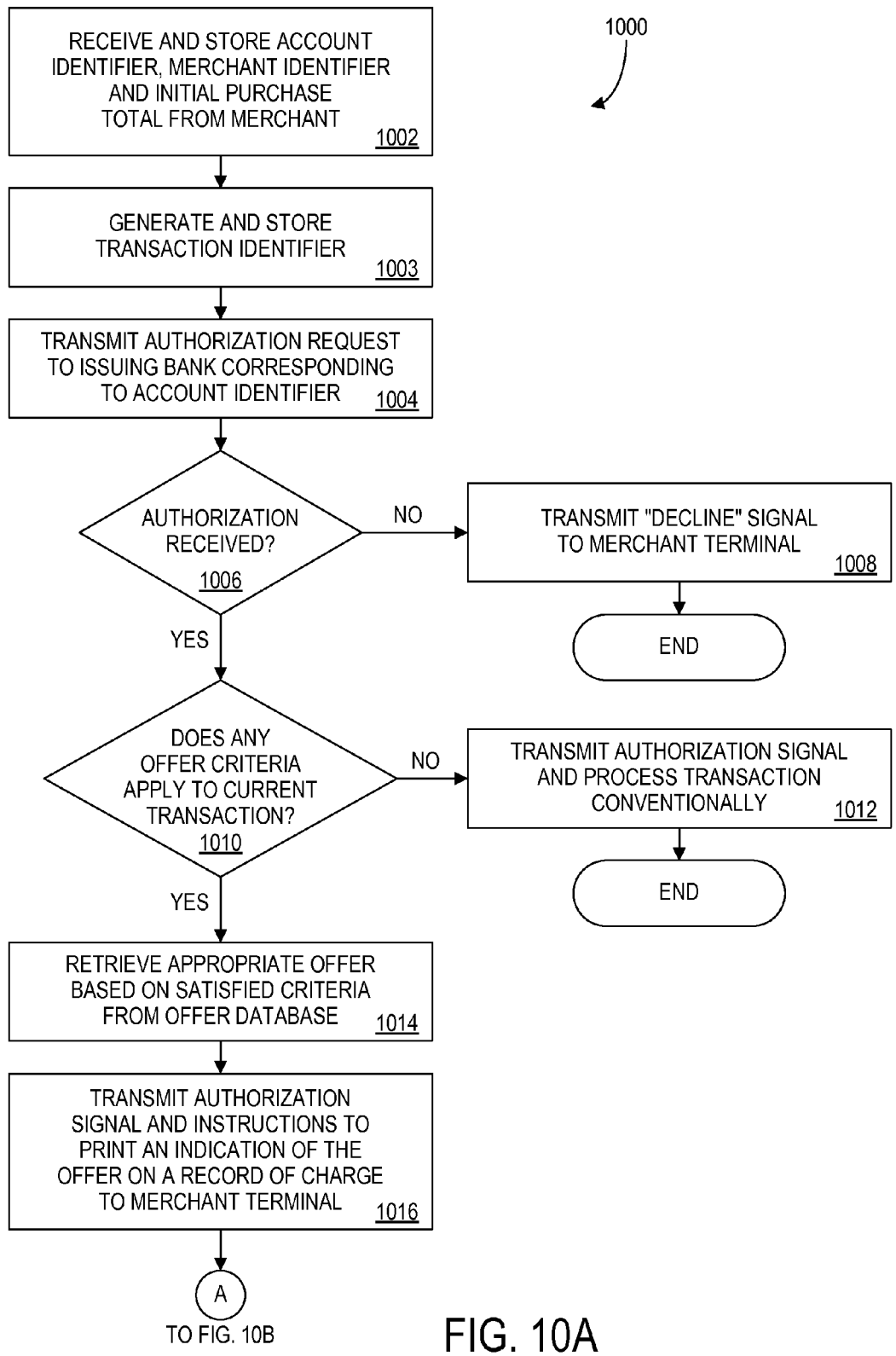
FIGS. 10A and 10B are a flowchart illustrating exemplary steps performed by the clearinghouse server of FIG. 4 during a transaction.
Figure 10B:
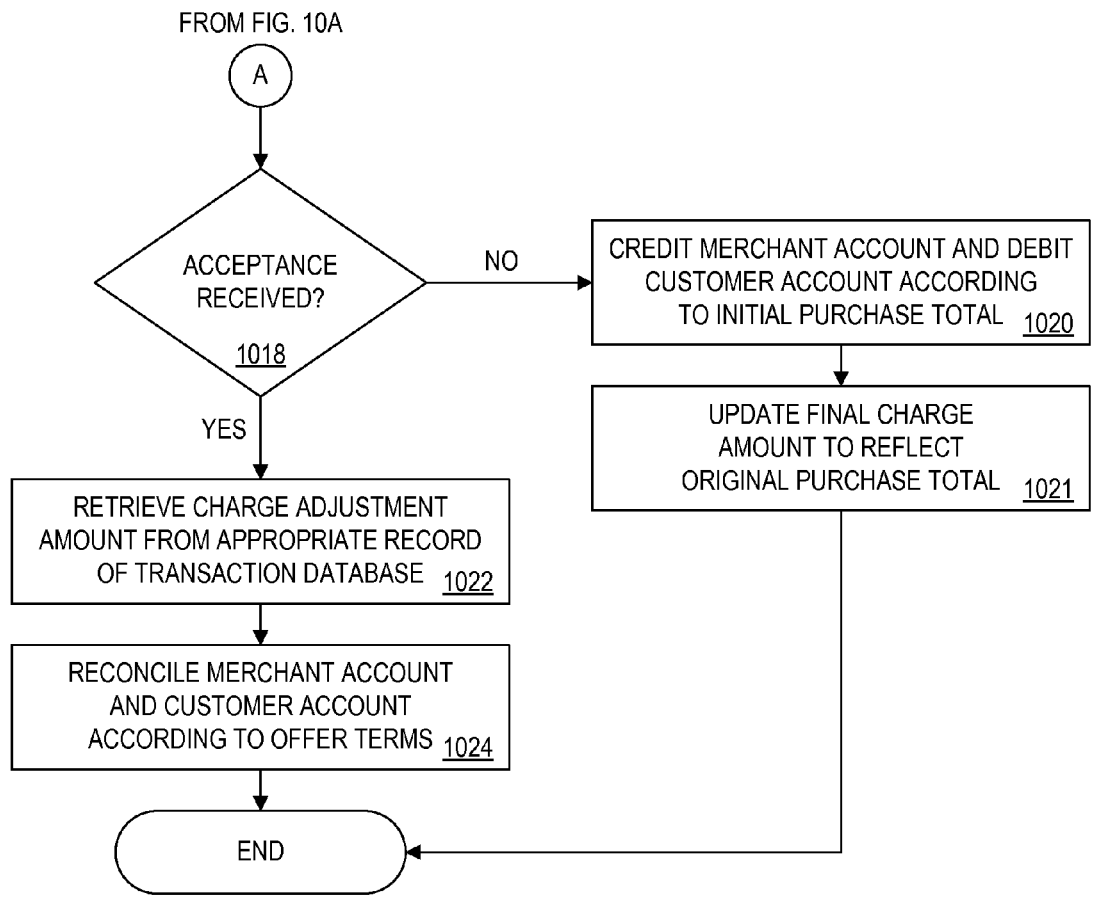

FIGS. 10A and 10B illustrate a preferred process 1000 performed by clearinghouse server 104 for authorizing a credit or debit card transaction and providing a charge enhancement offer in accordance with the present invention. Process 1000 occurs between steps 906 and 908 of process 900. Process 1000 begins when clearinghouse server 104 receives a request for authorization including transaction information such as a financial account identifier, merchant identifier and original purchase total from a merchant server 108 (step 1002). This information is stored in the appropriate fields of transaction database 416, including a time and date the request was received. At step 1003, clearinghouse server 104 generates a unique transaction identifier and stores the identifier in the transaction identifier field 802 of the appropriate record of the transaction database 416. The clearinghouse server 104 then transmits a query to the issuing bank server corresponding to the received financial account identifier to determine whether the transaction can be authorized (i.e. whether the financial account is in good standing) (step 1004). Clearinghouse server 104 then waits for a predetermined amount of time for an authorization of the original purchase total from the issuing bank server (step 1006). If an authorization is not received from the issuing bank server or if the issuing bank server declines the transaction, process 1000 continues to step 1008 where an indication that the authorization has been declined is transmitted to merchant server 108. If, however, an authorization signal is received from the issuing bank server, process 1000 continues to step 1010.

At step 1010, clearinghouse server 104 compares the received transaction information to information stored in offer database 414 to determine whether any offer should be transmitted with the authorization of the purchase amount for the transaction. If no offer criteria apply to the transaction information, clearinghouse server 104 transmits only the authorization signal to merchant server 108 (step 1012). The transaction is then completed conventionally by the merchant server 108 and POS terminal 110, and process 1000 ends. If, however, a charge enhancement offer is found to be applicable to the transaction on the basis of offer criteria stored in field 704 of the offer database 414, process 1000 continues to step 1014.

At step 1014, clearinghouse server 104 retrieves the appropriate charge enhancement offer data stored in field 706 which corresponds to the offer criteria in field 704 determined to be applicable during step 1010. If the offer includes an additional amount to be charged to the customer financial account upon acceptance of the charge enhancement offer by the customer, clearinghouse server 104 may optionally transmit a second request to the issuing bank server in order to authorize the additional amount. If the issuing bank server does not approve the authorization request for the additional amount, the charge enhancement offer may not be presented to the customer and the transaction may be processed conventionally. If the issuing bank server does approve the authorization request for the additional amount, the authorization and charge enhancement offer data is then transmitted by clearinghouse server 104 to merchant server 108. In all instances in which an additional purchase amount is not required in conjunction with the charge enhancement offer, the authorization and the charge enhancement offer data to be printed on the record of charge are transmitted by clearinghouse server 104 to merchant server 108 (step 1016).

Turning now to FIG. 10B, process 1000 continues at step 1018. However, it should be understood that steps 1018 through 1024 are performed after the completion of the portion of the subject transaction between the customer and the merchant. It should also be noted that in the preferred embodiment steps 1018 through 1024 can not be completed until the clearinghouse, merchant bank and/or issuing bank receive a copy of the record of charge to determine whether the customer has accepted the offer of charge enhancement.

At step 1018, the clearinghouse server 104 determines whether the customer has accepted the charge enhancement offer output to him or her at the POS terminal during the transaction. This may be determined by, for example, seeing if the customer has signed the signature line corresponding to the charge enhancement offer. Alternately, it may be determined that a customer has accepted a charge enhancement offer by receipt of a signal generated by either the merchant bank server 106 or the issuing bank server associated with the customer's financial account. In addition, it may be necessary to determine whether the customer has completed any required information, such as answering questions to a survey, questionnaire or the like. If the customer has accepted the charge enhancement offer, process 1000 continues to step 1022, discussed below. However, if the customer has not accepted the charge enhancement offer, the customer's account is debited by the original purchase total and the merchant's account is credited with the original purchase total (step 1020). The final purchase total stored in fields 812 and 614 will be determined to reflect the original purchase total (step 1021). Process 1000 then ends.

If, however, the customer has accepted the offer, process 1000 continues to step 1022 where clearinghouse server 104 retrieves from field 708 the appropriate offer adjustment amount to be applied to the customer's financial account (step 1022). Clearinghouse server 104 then reconciles the merchant account and the customer financial account according to the terms set forth by the particular offer (step 1024), after which process 1000 ends.

Figure 11:
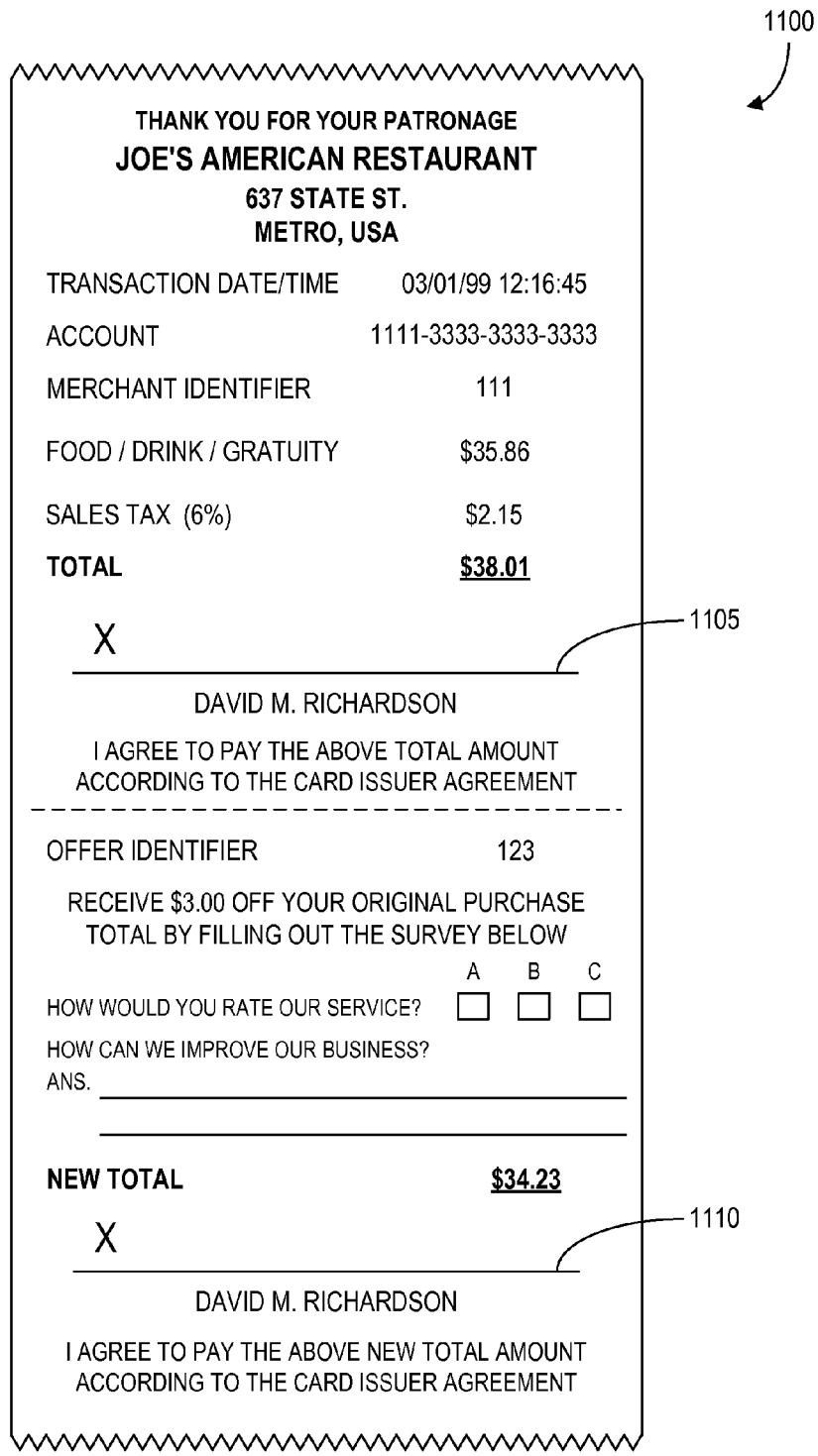
FIG. 11 illustrates an exemplary record of charge produced according to a first aspect of the present invention.

Various forms of a record of charge presented in accordance with the present invention are discussed below. FIG. 11 illustrates a first exemplary record of charge 1100 generated by merchant POS terminal 110 in order to facilitate completion of a transaction between a customer and the merchant. Record of charge 1100 is illustrated wherein the customer is provided with a signature line 1105 corresponding to the original purchase total as well as a separate signature line 1110 for indicating an acceptance of an offer and acknowledging an adjusted purchase amount in exchange for completing a survey.

Figure 12:
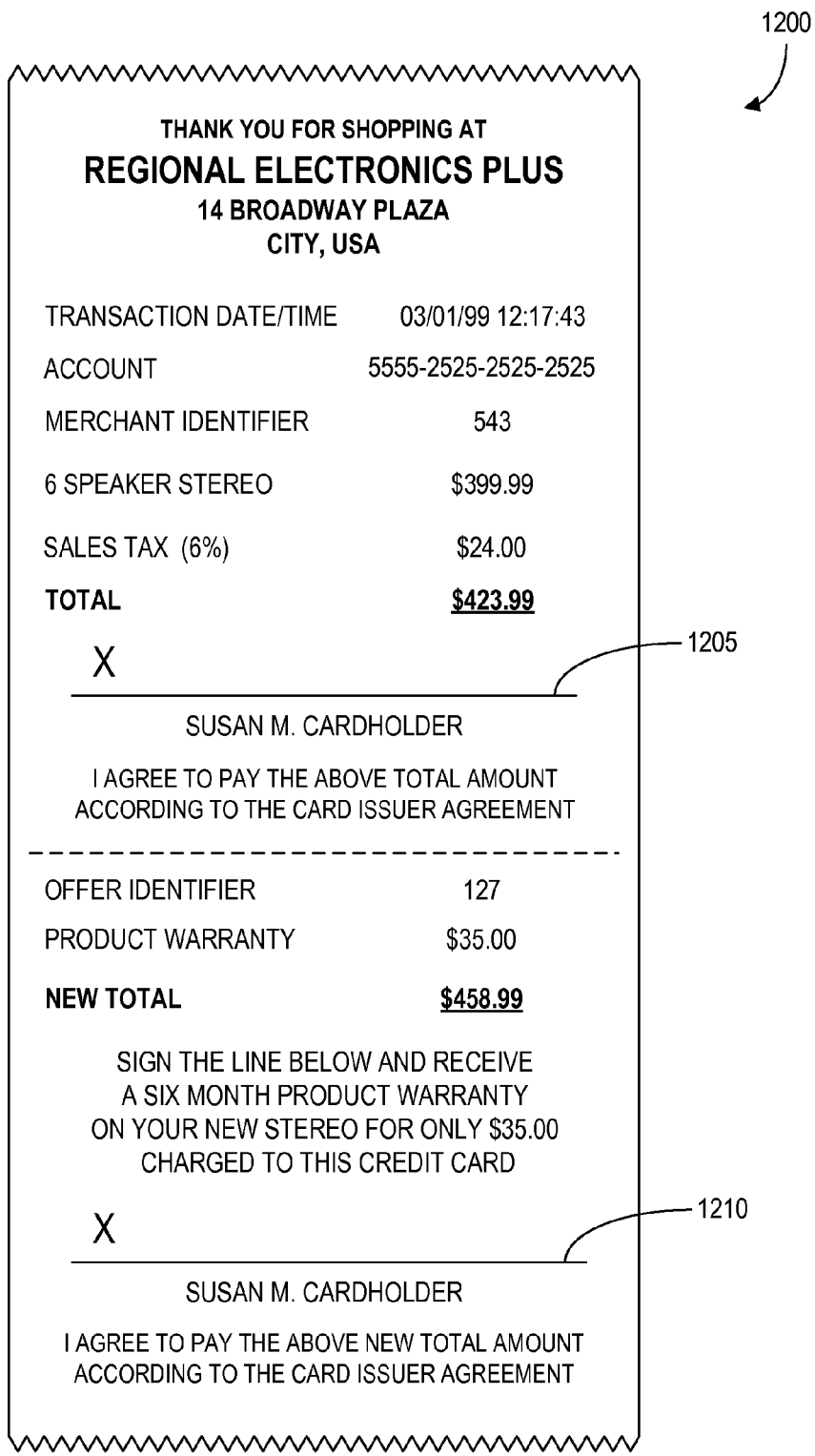
FIG. 12 illustrates an exemplary record of charge produced according to a second aspect of the present invention.

FIG. 12 illustrates a second exemplary record of charge 1200 generated by merchant POS terminal 110 in order to facilitate completion of a transaction between a customer and the merchant. Record of charge 1200 is illustrated wherein the customer is provided with a signature line 1205 corresponding to the original purchase total and a separate signature line 1210 for indicating an acceptance of an offer and acknowledging an adjusted purchase amount corresponding to the purchase of a warranty for a product involved in the subject transaction.

Figure 13:
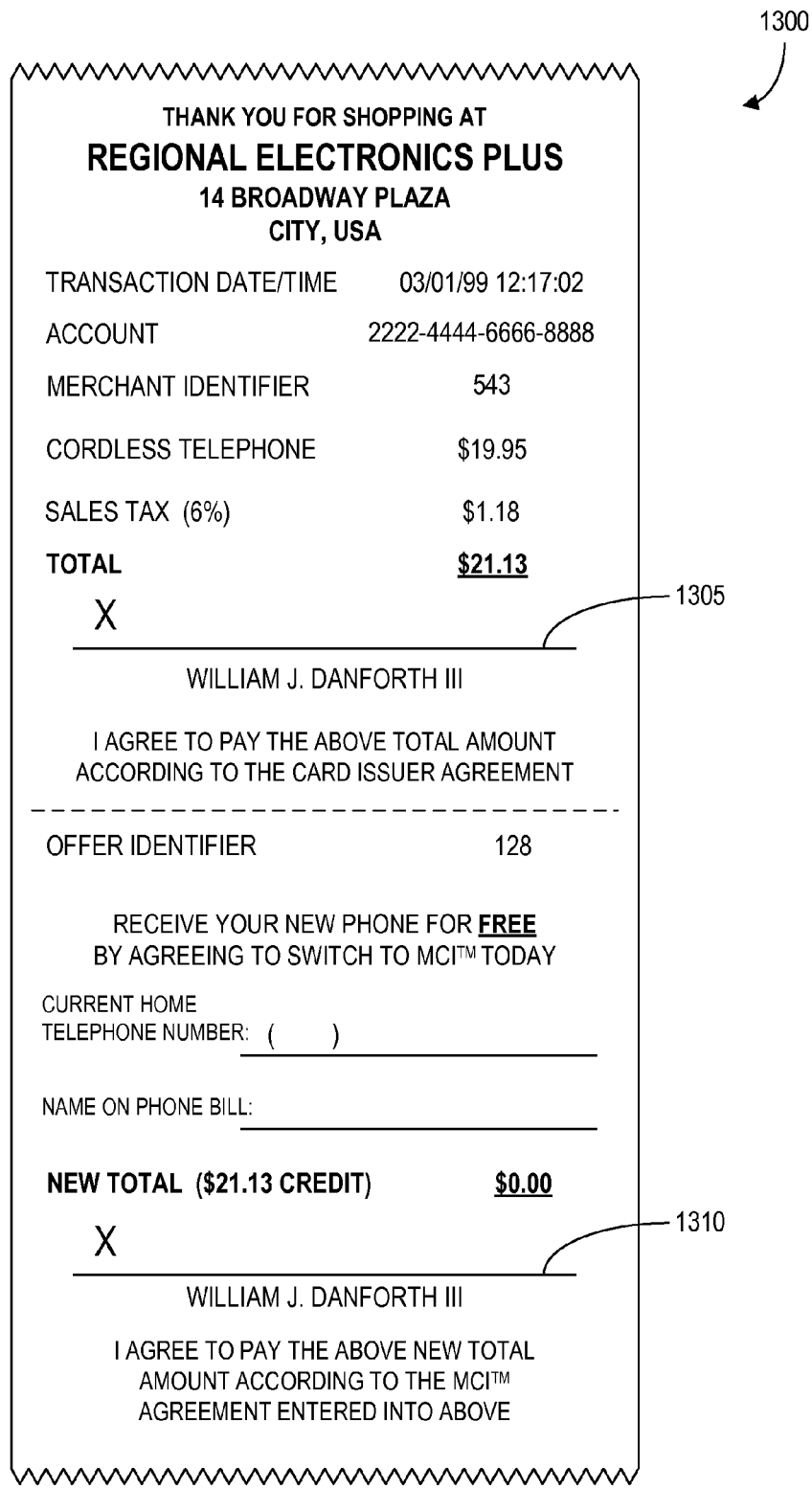
FIG. 13 illustrates an exemplary record of charge produced according to a third aspect of the present invention.

FIG. 13 illustrates a third exemplary record of charge 1300 generated by merchant POS terminal 110 in order to facilitate completion of a transaction between a customer and the merchant. Record of charge 1300 is illustrated wherein the customer is provided with a signature line 1305 corresponding to the original purchase total and a separate signature line 1310 for indicating an acceptance of an offer and acknowledging an adjusted purchase amount in exchange for accepting a cross-subsidy offer.

Figure 14:
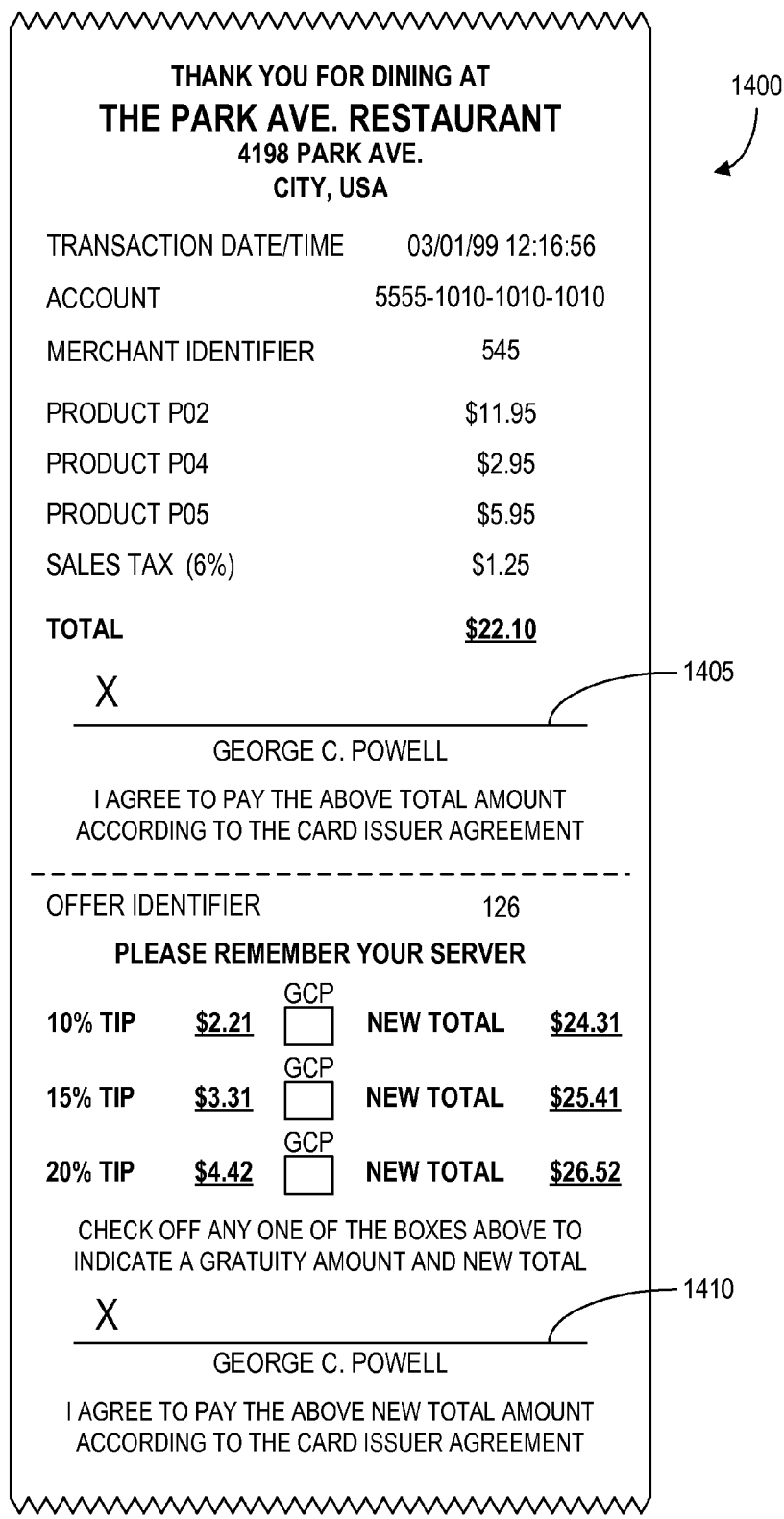
FIG. 14 illustrates an exemplary record of charge produced according to a fourth aspect of the present invention.

FIG. 14 illustrates a fourth exemplary record of charge 1400 generated by merchant POS terminal 110 in order to complete a transaction between a customer and the merchant. Record of charge 1400 is illustrated wherein the customer is provided with a signature line 1405 corresponding to the original purchase total and a separate signature 1410 line for indicating an acceptance of an offer and acknowledging an adjusted purchase amount according to an additional percentage applied to the original purchase total as a gratuity.

In one alternate embodiment of the present invention, it is contemplated that a charge enhancement offer may be presented to a customer on a display of the merchant POS terminal or a card authorization terminal attached thereto at the time of the transaction rather than on a record of charge. The customer may accept the charge enhancement offer by pushing appropriate buttons located on or near the terminal or, by providing a signal to a device capable of capturing data representing the customer's signature. An example of one such device is the SCANTEAM® 8900 SIGNATURE CAPTURE PAD manufactured by ACCESS KEYBOARDS LTD. The discount or increment associated with the offered charge enhancement could then be applied immediately to produce an adjusted final purchase total. Also in this embodiment, rather than a discount to be applied to the customer's financial account, the customer may be presented with a coupon printed or otherwise made immediately available to the customer at the merchant POS terminal following the customer acceptance of the charge enhancement offer.

While the best mode contemplated for carrying out the invention has been described in detail in the foregoing, those of ordinary skill in the art to which the instant invention relates will recognize various alternative designs and embodiments for practicing the invention. In particular, the methods and systems disclosed above, though discussed in terms of transactions involving a credit or debit card are equally applicable to other types of transactions from other types accounts, such as savings accounts, money market accounts or the like. It is to be understood that the databases and data stored therein, as depicted in the figures, may be rearranged or combined into equivalent structures. It is to be further understood that although the embodiments have been discussed in terms of sales of products, the present invention may be equally applicable to the sale of services. Accordingly, it is to be understood that the foregoing description is provided for illustrative purposes only and does not limit the scope of the instant invention, as defined by the appended claims.

We claim:

1. An apparatus for providing an offer during a transaction between a merchant and a customer, comprising: a processor, and
a storage device in communication with the processor, the storage device storing instructions that when executed by the processor direct the processor that is configured to perform:
receiving a request for authorization of a purchase amount, the purchase amount to be paid from a financial account of the customer;
determining an offer based on the received request;
transmitting an authorization of the purchase amount;
transmitting the offer for output to the customer on a record of charge wherein the record of charge includes a first signature line associated with and for indicating acceptance of the purchase amount only and a second signature line associated with and for indicating acceptance of the offer output on the record of charge;
receiving an acceptance of the offer by the customer; and
providing a benefit to the customer after receiving the acceptance, in which the offer defines an obligation for the customer to fulfill in exchange for the benefit.

2. The apparatus of claim 1, the storage device storing instructions that when executed by, the processor direct the processor further to perform:
determining that the customer has signed the second signature line of the record.

3. The apparatus of claim 1, in which the offer is a cross-subsidy offer and in which the benefit comprises a discount toward the purchase amount.

4. The apparatus of claim 1, in which the offer is selected from the group consisting of:
a supplemental product offer for the obligation of an additional payment in addition to the purchase amount to be provided by the customer in exchanged for a supplemental product, and
a cross-subsidy offer for providing a discount toward the purchase amount in exchange for the obligation of the customer accepting an offer of a third party other than the customer and the merchant.

5. The apparatus of claim 1, in which receiving the request comprises receiving the request by a central controller.

6. The apparatus of claim 1, in which receiving the acceptance comprises receiving the acceptance by a central controller.

7. The apparatus of claim 1, the storage device storing instructions that when executed by the processor direct the processor further to perform:
adjusting an available credit limit of the financial account based on the indicated acceptance of the offer.

8. The apparatus of claim 1, in which adjusting comprises:
providing a discount on the purchase amount.

9. The apparatus of claim 1, wherein adjusting comprises:
providing a reward of alternate currency after the acceptance.

10. The apparatus of claim 1, wherein transmitting the authorization comprises:
determining whether the financial account is in good standing; and
transmitting the authorization for the transaction if the financial account is in good standing.

11. The apparatus of claim 10, wherein determining whether the account is in good standing comprises:
determining whether an available balance of the financial account is at least zero.

12. The apparatus of claim 10, wherein determining whether the account is in good standing comprises:
   determining whether an available balance of the financial account is at least zero after acceptance of the offer by the customer.

13. The apparatus of claim 1, wherein transmitting the offer further comprises:
   determining whether the financial account is in good standing; and
   transmitting the offer for output to the customer on a record of charge if the financial account is in good standing.

14. The apparatus of claim 13, wherein determining whether the account is in good standing comprises:
   determining whether an available balance of the financial account is at least zero.

15. The apparatus of claim 13, wherein the step of determining whether the account is in good standing comprises:
   determining whether an available balance of the financial account is at least zero after acceptance of the offer by the customer.

16. The apparatus of claim 1, wherein the offer is determined based on a product identifier of a product purchased during the transaction.

17. The apparatus of claim 1, wherein the offer is determined based on a merchant identifier.

18. The apparatus of claim 1, wherein the offer is determined based on the purchase amount.

19. The apparatus of claim 1, wherein the offer comprises a requirement that the customer use a service for a predetermined time.

* * * * *